United States Patent
Sanding et al.

(10) Patent No.: US 8,417,231 B2
(45) Date of Patent: Apr. 9, 2013

(54) METHOD AND APPARATUS FOR PROGRAMMING A MOBILE DEVICE WITH MULTIPLE SERVICE ACCOUNTS

(75) Inventors: Anthony Sanding, San Diego, CA (US); Balaji Vaidyanathan, San Diego, CA (US); Yogesh Tugnawat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 12/467,281

(22) Filed: May 17, 2009

(65) Prior Publication Data

US 2010/0291898 A1  Nov. 18, 2010

(51) Int. Cl.
*H04M 3/00* (2006.01)
(52) U.S. Cl. ..... 455/418; 455/419; 455/420; 455/432.3; 455/552.1; 717/168; 719/328; 719/332
(58) Field of Classification Search .......... 455/418–420, 455/432.3, 552.1; 717/168–178; 719/329–332
See application file for complete search history.

(56) References Cited

U.S. PATENT DOCUMENTS

| | | | |
|---|---|---|---|
| 5,734,487 A | 3/1998 | Rossi | |
| 5,887,254 A | 3/1999 | Halonen | |
| 6,829,222 B2 | 12/2004 | Amis et al. | |
| 6,876,295 B1 | 4/2005 | Lewis | |
| 6,975,632 B2 | 12/2005 | Deo et al. | |
| 6,978,453 B2 | 12/2005 | Rao et al. | |
| 7,200,390 B1 | 4/2007 | Henager et al. | |
| 7,305,090 B1 * | 12/2007 | Hayes et al. | 380/249 |
| 7,461,374 B1 * | 12/2008 | Balint et al. | 717/174 |
| 7,516,206 B2 | 4/2009 | Henseler et al. | |
| 7,565,650 B2 | 7/2009 | Bhogal | |
| 7,769,371 B1 * | 8/2010 | Lamb et al. | 455/420 |
| 8,150,425 B1 | 4/2012 | Soelberg et al. | |
| 2004/0018853 A1 | 1/2004 | Lewis | |
| 2004/0031030 A1 | 2/2004 | Kidder et al. | |
| 2004/0230965 A1 | 11/2004 | Okkonen | |
| 2004/0237081 A1 | 11/2004 | Homiller | |
| 2005/0010916 A1 | 1/2005 | Hagen et al. | |
| 2005/0054336 A1 * | 3/2005 | Sanding | 455/418 |
| 2005/0055689 A1 | 3/2005 | Abfalter et al. | |

(Continued)

FOREIGN PATENT DOCUMENTS

| | | |
|---|---|---|
| DE | 19543843 A1 | 5/1997 |
| EP | 1085395 A2 | 3/2001 |

(Continued)

OTHER PUBLICATIONS

International Search Report and Written Opinion—PCT/US2010/035149, International Search Authority—European Patent Office—Sep. 28, 2010.

*Primary Examiner* — Lester Kincaid
*Assistant Examiner* — Mehmood B Khan
(74) *Attorney, Agent, or Firm* — James T. Hagler

(57) ABSTRACT

Methods and systems enable mobile devices equipped with software defined radio based chipset modules to seamlessly re-program the mobile device to operate on any of a variety of service provider networks. By re-programming a mobile device equipped with software defined radio based chipset module, the mobile device can support communications over both GSM and CDMA communication networks. An environment is provided which allows a user to quickly and efficiently switch between service provider accounts supporting communications.

24 Claims, 16 Drawing Sheets

U.S. PATENT DOCUMENTS

| | | |
|---|---|---|
| 2006/0203722 A1* | 9/2006 | Oommen .................. 370/229 |
| 2006/0221918 A1 | 10/2006 | Wang |
| 2006/0277539 A1* | 12/2006 | Amarasinghe et al. ....... 717/168 |
| 2007/0129078 A1* | 6/2007 | De Beer .................... 455/445 |
| 2008/0177994 A1 | 7/2008 | Mayer |
| 2008/0266595 A1 | 10/2008 | Wright et al. |
| 2009/0075698 A1 | 3/2009 | Ding et al. |
| 2009/0100420 A1* | 4/2009 | Sapuntzakis et al. ........ 717/171 |
| 2009/0196268 A1* | 8/2009 | Caldwell et al. ............ 370/338 |
| 2009/0215449 A1* | 8/2009 | Avner ...................... 455/433 |
| 2010/0179991 A1 | 7/2010 | Lorch et al. |
| 2010/0182163 A1 | 7/2010 | Rennie et al. |
| 2010/0274930 A1 | 10/2010 | Thakkar et al. |
| 2010/0291910 A1 | 11/2010 | Sanding et al. |
| 2011/0010543 A1* | 1/2011 | Schmidt et al. ............ 713/168 |
| 2011/0035741 A1 | 2/2011 | Thiyagarajan |
| 2011/0191572 A1 | 8/2011 | Taylor et al. |
| 2011/0191844 A1* | 8/2011 | Bogineni et al. ............ 726/12 |
| 2011/0296399 A1 | 12/2011 | Tugnawat et al. |

FOREIGN PATENT DOCUMENTS

| | | |
|---|---|---|
| EP | 1473845 A1 | 11/2004 |
| EP | 1551107 | 7/2005 |
| EP | 1761088 A1 | 3/2007 |
| GB | 2292047 A | 2/1996 |
| WO | WO9317512 A1 | 9/1993 |

* cited by examiner

| Parameter/Setting | Service Provider 1 | Service Provider 2 | Service Provider 3 | Service Provider 4 |
|---|---|---|---|---|
| Mode of Activation | OTASP | IOTA | OTASP | IOTA |
| NAI MIP User Profile N, where N = {0, 1, 2, ...} | MDN@SP1.com | MEID@ham.SP2.com | MDN@1x.SP3mobility.com | 00000WXYZ@iota.1x.SP4.ca |
| NAI MIP User Profile N, where N = {0, 1, 2, ...} | Not used | name@SP2.com | Not Used | MDN@3a.1x.SP4.ca |
| MN-HA Shared Secret MIP User Profile N, where N = {0, 1, 2, ...} | All zeros (16 Bytes) after DMU update it gets changed | "secret" | First 16 digits of Akey | 8 character pESN is Upper Case |
| MN-HA Shared Secret MIP User Profile N, where N = {0, 1, 2, ...} | Not used | "secret" | Not Used | 8 character pESN is Upper Case |
| MN-AAA Shared Secret MIP User Profile N, where N = {0, 1, 2, ...} | All zeros (16 Bytes) | MD5 (Akey/MEID) | MEID | Factory Default Password = MD5 Function0 = MD5({<NAI>, iota}, where NAI is the factory default NAI Hardcoded after MDN Programmed = MD5 Function3 {NAI, iota}, where NAI is the hardcoded NAI |
| MN-AAA Shared Secret MIP User Profile N, where N = {0, 1, 2, ...} | Not used | 8 characters (populated by IOTA) | Not Used | MD5 (Akey + "aaaaa" + MEID) |
| SIP AAA NAI | MDN@SP1.com | Not Used | MDN@1x.SP3.com | Not Used |
| SIP AAA Password | All zeros before DMU Update | Not Used | MEID HEX 14 Digit | Not Used |

Fig. 3

| Parameter/Setting | Service Provider 1 | Service Provider 2 | Service Provider 3 | Service Provider 4 |
|---|---|---|---|---|
| MN Authenticator | 11111(base10) | Not required | Not required | Not required |
| MN HA SPI Set | Enable | Enable | Enable | Enable |
| MN HA SPI Value | 300 | 1234 | 200 (512) | 1235 |
| MN AAA SPI Set | Enable | Enable | Enable | Enable |
| MN AAA SPI Value | 2 | 1234 | 2 | 2 |
| Reverse Tunneling | Enable | Enable | Enable | Enable |
| ONC Enabled | Enable | Disable | Disable | Disable |
| Home Address | 0.0.0.0 | 0.0.0.0 | 000.000.000.000 | Not Used |
| Primary HA Address (0..f) | Dynamic, no Slot 1 Usage 255.255.255.255 | IOTA HA Address needs to be written in Slot-0, Slot-1 HA Address is populated by IOTA, need to leave them as <null string> | 255.255.255.255 (Single slot used for data) | IOTA HA Address needs to be written in Slot-0, Slot-1 HA Address is populated by IOTA, need to leave them as <null string> |
| Secondary HA Address(0..f) | 255.255.255.255 | IOTA HA Address needs to be written in Slot-0, Slot-1 HA Address is populated by IOTA, need to leave them as <null string> | 0.0.0.0 | IOTA HA Address needs to be written in Slot-0, Slot-1 HA Address is populated by IOTA, need to leave them as <null string> |
| Initial Registrations Retry Interval Time | 3 | 4 | 2 | 4 |
| Registry Retry Number | 2 | 1 | 2 | 1 |
| DS MIP Deregistration Retries | 2 | 1 | 2 | |
| Pre-Lifetime-expiry RE-registration time | 0 | 30 | 30 | 30 |

Fig. 4

| Parameter/Setting | Service Provider 1 | Service Provider 2 | Service Provider 3 | Service Provider 4 |
|---|---|---|---|---|
| SPC | "000000" | 6 digit random number (Should match with EDF info) | 6 digit random number | 6 digit random number |
| OTKSL | "000000" | 6 digit random number (Should match with EDF info) | 6 digit random number (also requires CSL) | 6 digit random number |
| Number of Incorrect SPC Attempts | 15 | 5 | ? | 5 |
| Field Service Code | "000000" (vendor proprietary) | "040793" Vendor proprietary (Should match EDF info) | vendor proprietary | vendor proprietary |
| Akey Checksum | Generic | Generic | Generic | Generic |
| SMS Support | Yes | No | Yes | Yes (Need to Confirm) |

Fig. 5

METHOD AND APPARATUS FOR PROGRAMMING A MOBILE DEVICE WITH MULTIPLE SERVICE ACCOUNTS

FIELD OF THE INVENTION

The present invention relates generally to provisioning and programming a mobile device, and more particularly to methods and apparatus for provisioning and programming multiple service provider accounts on a single mobile device.

BACKGROUND

Typically, conventional cellular communications devices operate using one of two main competing network technologies. Namely, Global System for Mobile Communications (GSM) or Code Division Multiple Access (CDMA). While there are a number of differences between the two competing technologies, at the core GSM implements a time-division multiplexing scheme, while CDMA (as its name implies) implements a code-based multiplexing scheme. In a GSM network a portion of the network's total bandwidth is allocated as a channel to a mobile device. The network base station then selectively "listens" to each of the allocated channels for a short amount of time to send and receive voice and/or data information to and from the mobile device. The base station can only selectively listen to the allocated channel for a short amount of time because it must also listen to other channels allocated to other mobile devices operating on the network. While effective, the TDMA scheme is hampered by its limited bandwidth and need to dedicate a single channel to a single mobile device.

In contrast, in a CDMA network, each channel may be utilized by multiple mobile devices. In order to differentiate the information received from different mobile devices operating on the same allocated channel, each mobile device is assigned a different coding offset in which to encode its voice and/or data information. By selectively switching the decoding code offset, the base station can decode the information received from multiple mobile devices operating on the same allocated channel. This greatly increases the capacity to service more mobile devices on the same amount of total bandwidth.

In addition to the multiplexing and encoding schemes implemented on each of the competing technologies, individual service providers operating competing communication networks may modify other aspects of the communication signals being sent and received over their respective communication networks. This allows each service provider to differentiate their network from another and in some instances offer differentiating features to its customers. These aspects may include communication signal waveforms, frequency, amplitude, etc.

In order to properly operate on a particular service provider's network, a mobile device must be equipped with the necessary hardware to generate the appropriate waveform with the correct modulation, and coding scheme as required by the service provider's network. Because of the fundamental differences in the type of waveform, modulation and coding schemes used between the two competing networks, mobile devices equipped with the necessary hardware to operate on a GSM technology network cannot operate on a CDMA technology network, and vice versa.

Moreover, competing service providers operating similar technology (e.g., GSM or CDMA) networks typically implement proprietary provisioning data that allows a mobile device to operate on a particular service provider's network. Each service provider typically employs a number of provisioning parameters that are unique in their usage or format. Conventional mobile devices store the provisioning data for the single service provider with which the device has been registered. While conventional mobile devices may be able to conduct communications over a different service provider's communication network (provided it is of the same technology type), such usage will be only permitted in accordance with the roaming rules and permissions dictated by the provisioning data loaded into the mobile device. If a user of a conventional mobile device wishes to utilize a different service provider's communication network for primary (i.e., non-roaming) service, the provisioning data loaded into the mobile device must be deleted and replaced with provisioning data of the newly selected service provider. Typically, such a change may only be made by activating a new account with the newly selected service provider. If the user subsequently desires to revert back to the original service provider's communication network for primary service, then a new account on the original service provider's network must be activated and the previous account data deleted.

In some settings, a removable smart card such as a Subscriber Identity Module (SIM) card or analogous R-UIM card may allow a user to interchange the provisioning data loaded into a mobile device without the need for service provider intervention. The provisioning data for different service providers may be stored on the removable smart card. Because each smart card may store the provisioning data for a different service provider a user may physically interchange smart cards in a mobile device to use different service provider networks for primary service. However, the need to physically interchange smart cards requires a user to carry multiple smart cards. In addition, the physical interchange of smart cards is cumbersome. Lastly, the use of smart cards still does not allow a mobile device equipped with the necessary hardware to operate on a GSM technology network to operate on a CDMA technology network and vice versa.

SUMMARY

Various embodiment methods and systems are provided to store in non-volatile memory the necessary software builds and provisioning data parameters for multiple service providers so that an appropriately equipped mobile device can operate on any of a number of different service providers. Such a mobile device may include a software based radio chipset module enabling it to communicate with cellular networks of all technology types (including GSM and CDMA). Various embodiments further provide a method, system and device for switching between the software builds and provisioning data of different service providers. Additional embodiments provide a method for preventing the launching of multiple service provider connection managers which could result in a conflict in the programming of a mobile device.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 3 is an exemplary data table of dynamic parameters utilized by different service provider accounts.

FIG. 4 is an exemplary data table of static parameters utilized by different service provider accounts.

FIG. 5 is an exemplary data table of security parameters utilized by different service provider accounts.

DETAILED DESCRIPTION

Figure 1:
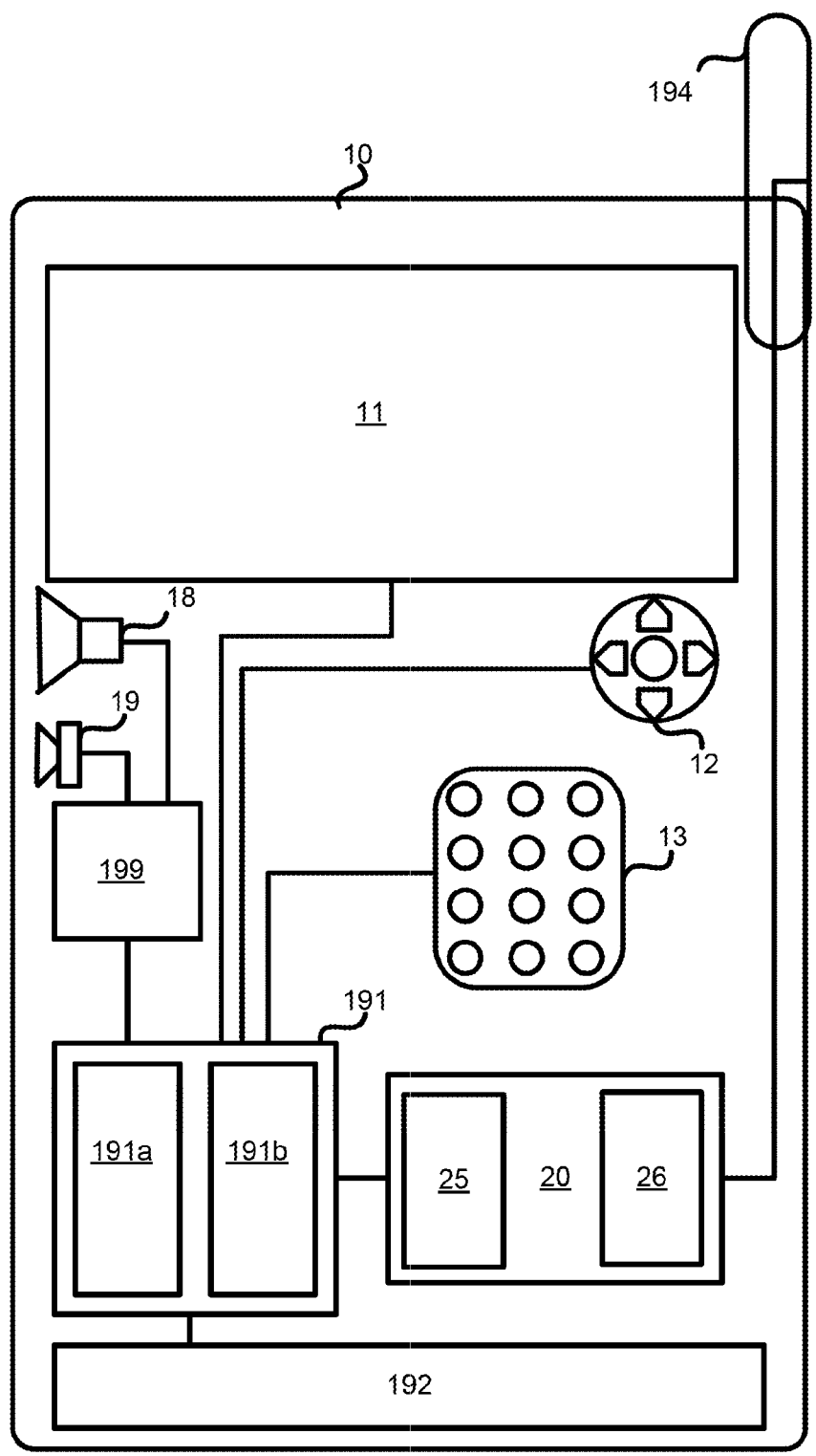
FIG. 1 is a block diagram depicting typical components of a mobile device capable of supporting the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the term "exemplary" is used herein to mean "serving as an example, instance, or illustration." Any implementation described herein as "exemplary" is not necessarily to be construed as preferred or advantageous over other implementations.

As used herein, the term "mobile device" is intended to encompass any form of programmable computer as may exist or will be developed in the future which implements a communication module for wireless voice and data communications, including, for example, cellular telephones, personal data assistants (PDA's), palm-top computers, laptop and notebook computers, wireless electronic mail receivers (e.g., the Blackberry® and Treo® devices), multimedia Internet enabled cellular telephones (e.g., the iPhone®), and similar personal electronic devices which include a wireless communication module, processor and memory. In a preferred embodiment, the mobile device is a portable computer with a software defined radio based chipset module.

Conventional mobile devices have typically been designed to operate on a single service provider's communication network. More specifically, conventional mobile devices have been designed to operate on a single communication technology (e.g., GSM v. CDMA). For example, cellular telephones have been typically purchased directly from a service provider for use on that service provider's network. Similarly, wireless modem cards for notebook computers are typically bought and sold directly from the service provider. Because of the fundamental differences between the competing technologies, the hardware contained within the mobile device enabling communications on one competing technology prevents the same mobile device from communicating with a network of another competing technology.

Moreover, even as two separate service providers may implement the same communication technology, different service providers may provide their customers with different feature sets. Consequently, even if the hardware enabling communication is the same, the software enabling communications on one service provider's communication network may vary greatly from that of a different service provider. Accordingly, a different software build must be implemented on a mobile device for each service provider.

In addition, most conventional mobile devices have been designed to load a single service provider's provisioning data. Because competing service providers implement proprietary provisioning data, conventional mobile devices operating on one service provider's communication network cannot operate on another service provider's communication network (as a primary service) without deleting the first service provider's provisioning data and replacing it with the second service provider's provisioning data. While some mobile devices allow a user to exchange the provisioning data of different service providers through the interchange of smart cards, such methods are cumbersome and still do not allow a user to utilize the communication networks of competing technologies.

In contrast to conventional mobile devices which use hardware to generate, encode/decode, and modulate/demodulate signals in conjunction with one of the competing technologies, future software defined radio based chipset modules, such as Qualcomm's Gobi®, generate, encode/decode and modulate/demodulate data signals within a programmable digital signal processor (DSP). The programmable DSP enables the communication signal to be defined by software to conform with the wave form, frequency and data packet requirements of any communication technology. By re-programming the DSP to generate signals with different characteristics, the mobile device may be made to generate a communication signal that is compatible with any service provider's unique communications network.

In order to re-program the DSP within the software defined radio based chipset to generate a data signal compatible with a selected service provider network, the mobile device must load an appropriate software build for the selected service provider. Each service provider's software build may contain the necessary instructions to generate, encode and modulate data signals to be properly carried over the service provider's communication network, as well as contain the necessary programming to carry out all of the additional features offered by the service provider. The various embodiments provide the capability to modify and switch various modules of the software build implemented on a mobile device. Various embodiments monitor which service providers have had an account activated by the mobile device so that previously generated parameters of a service provider's software build may be recycled. Other embodiments monitor the currently implemented service provider software build to prevent fatal collisions from occurring when a different software build is requested.

FIG. 1 depicts typical components of a mobile device 10 capable of supporting the various embodiments. A typical mobile device 10 includes a processor 191 or dual (or more) processors 191a and 191b coupled to internal memory 192 and a user interface display 11. The mobile device 10 may also include a software-defined communication module 20 which is capable of operating on any of a plurality of service provider communication networks. The software-defined communication module 20 may include non-volatile memory 25 and file systems 26 which may store an indexed table of service provider account parameters and settings for use in modifying the software operation of the device for a selected service provider.

The mobile device 10 may include an antenna 194 for sending and receiving electromagnetic radiation that is connected to the software-defined communication module 20 coupled to the processor 191. Further, the mobile device 10 includes a speaker 18 to produce audible sound and a microphone 19 for sensing sound, such as receiving the speech of a user. Both the microphone 19 and speaker 18 may be connected to the processor 191 via a vocoder 199 which transforms analog electrical signals received from the microphone 19 into digital codes, and transform digital codes received from the processor 191 into analog electrical signals which the speaker 18 can transform into sound waves. In some implementations, the vocoder 199 may be included as part of the circuitry and programming of the processor 191. Mobile devices also typically include a key pad 13 and menu selection buttons or rocker switches 12 for receiving user inputs.

The processor 191 may be any programmable microprocessor, microcomputer or multiple processor chip or chips that can be configured by software instructions (applications) to perform a variety of functions, including the functions of the various embodiments described below. In some mobile devices, multiple processors 191 may be provided, such as one processor dedicated to wireless communication functions and one processor dedicated to running other applications. In some mobile devices 10, multiple processors 191a, 191b may be provided to share wireless communication functions and/or application between them. Typically, software applications may be stored in the internal memory 192 before they are accessed and loaded into the processor 191. In some mobile devices, the processor 191 may include internal memory sufficient to store the application software instructions. In some mobile devices the processor 191 is included within the software-defined communication module 20, such as in Qualcomm's Gobi® which includes two processors in addition to signal generator and modem circuits.

Figure 2:
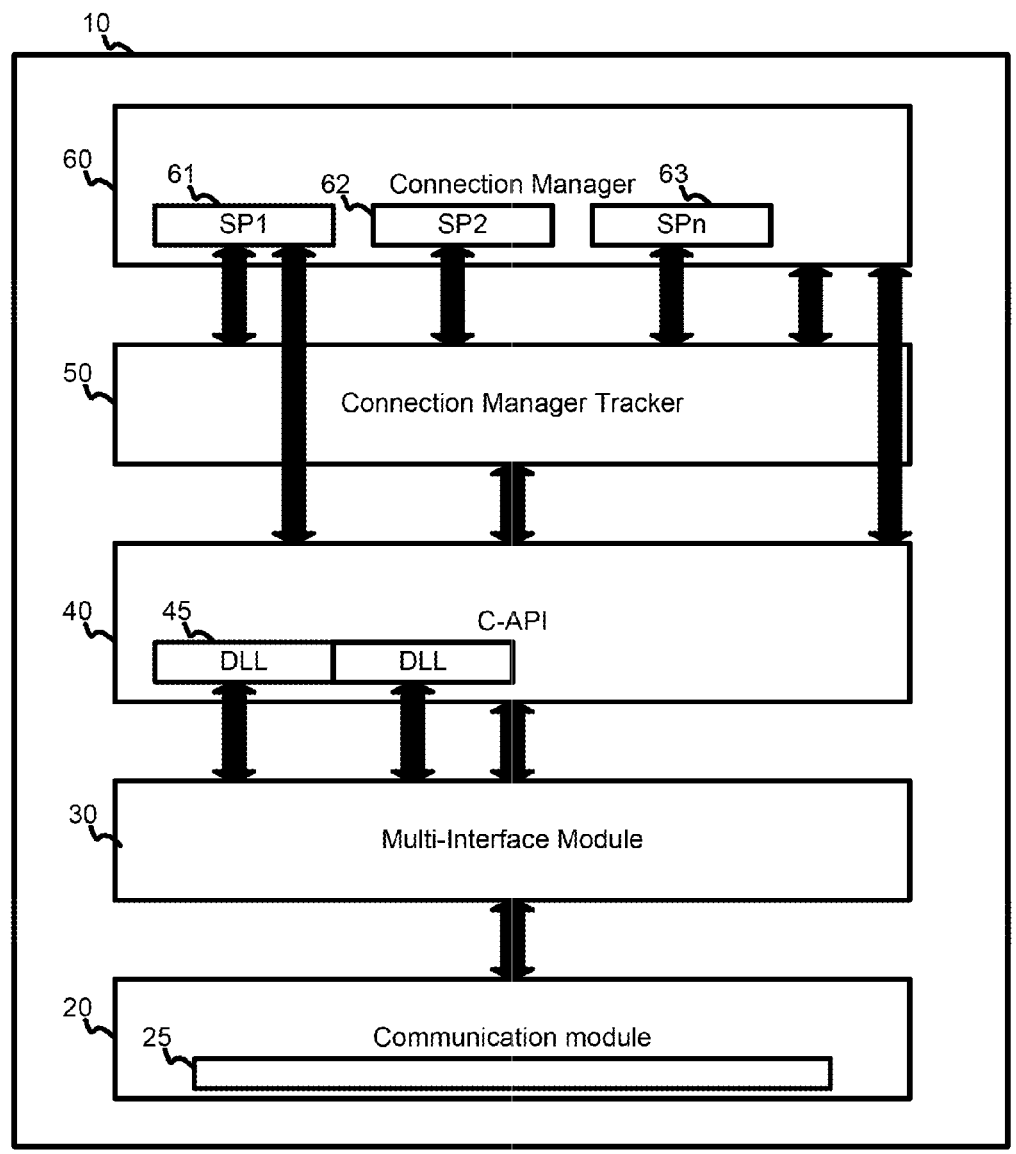
FIG. 2 is a hardware/software architecture diagram of software modules operating within a mobile device equipped with a software defined radio based chipset module.

FIG. 2 is a hardware/software architecture diagram of software modules on a mobile device equipped with a software defined radio based chipset modules. As shown in FIG. 2, the mobile device 10 includes a software defined radio based chipset communication module 20 (communication module), such as Qualcomm's Gobi®. The communication module 20 may optionally contain a non-volatile memory 25 which may store an indexed table of different service provider parameter configurations. In alternative embodiments the indexed data table may also be stored in a remote non-volatile memory (not shown) from which it can be retrieved. An example of the indexed data table is shown in more detail in FIG. 3, below. The various parameters stored in the indexed data table may be used when compiling the particular software build for each service provider supporting an account to which the mobile device has subscribed. Since each service provider may implement a unique software build the parameters for each service provider account often differ from other service provider accounts. In many cases a parameter used in the software build for one service provider may be in a different format or may not be used at all by a different service provider.

A multi-interface software module 30 functioning in a processor 191 is in communication with the communication module 20 and a common application programming interface (C-API) 40. The multi-interface software module 30 contains the actual coding for various subroutines called on by applications via the C-API 40. Developers of applications for mobile devices 10 can utilize the C-API 40 to access or interface with various subroutine stored in the multi-interface module 30 to perform desired functions. The subroutines stored in the multi-interface module 30 may be used to perform a variety of functions including, but not limited to, programming and retrieving information from the communication module 20. The C-API 40 may contain a number of dynamic link libraries (DLL) 45. By containing a number of dynamic link libraries 45, the C-API 40 may use the hooks to and from the multi-interface module 30 to provision the communication module 20 for a particular service provider. By utilizing dynamically linked libraries of common subroutines, the subroutines appropriate for a selected service provider may be loaded into an application program at runtime rather than at compile time.

When an account for a service provider is activated on the mobile device 10, the DLL 45 supporting that account is loaded into the C-API and stored for future retrieval. Each of the various service providers activated on a mobile device 10 may load an application programming interface specific to the particular service provider that uses its respective DLLs to facilitate the loading of the service provider's software build and provisioning data. Each of the DLLs 45 may be programmed to communicate with the multi interface software module 30. The C-API 40 is in communication with a connection manager tracker 50 or directly with a service provider's connection manager. The connection manager tracker 50 effectively acts as a "traffic cop" to insure that only a single service provider's software build is implemented on the mobile device 10 at a time. The connection manager tracker 50 determines which service provider account is selected and insures that only the software build corresponding to the selected service provider account is implemented. In the event a service provider account is selected that is not supported by the currently implemented software build, the connection manager tracker 50 may insure that the currently implemented software build is closed before the software build corresponding to the newly selected service provider account is launched. The connection manager tracker 50 is in communication with each individual connection manager 61, 62, 63 supporting each service provider account (SP1, SP2, SP3) activated on the mobile device 10. Each connection manager 61, 62, 63 is responsible for launching the corresponding software build by loading the appropriate subroutines from the DLLs 45 and retrieving the appropriate parameters stored in non-volatile memory 25.

In an alternative embodiment, the mobile device 10 may implement a common connection manager 60 which is a central application that is capable of setting up the communication links for a plurality of service provider accounts (SP1, SP2, SP3). In such an embodiment, the connection manager tracker 50 may be integrated within the common connection manager 60 or may continue to communicate with an external connection manager tracker 50 to insure that only a single service provider's software build is implemented on the mobile device 10 at a time.

FIGS. 3, 4, and 5 illustrate exemplary indexed data tables of dynamic, static and security parameters utilized by a variety of service provider accounts. As shown in FIGS. 3, 4, and 5, data associated with service provider accounts may be organized as a table containing a plurality of records (i.e., columns) associated with the service providers, with each record including a plurality of data fields (i.e., rows in FIGS. 3, 4, and 5) storing data settings associated with each service provider. The exemplary data table of FIGS. 3, 4 and 5 illustrates only 4 service providers (i.e., service provider 1, service provider 2, service provider 3 and service provider 4). However, one of ordinary skill in the art would appreciate that additional columns listing additional service providers may be included. Indeed, a data table may include every service provider operating in the world. Moreover, multiple columns for each service provider may be included in instances where a mobile device 10 maintains multiple accounts on the same service provider's communication network.

For each service provider, a variety of parameters and settings which are generated during the initial activation process of each respective service provider may be stored in data fields (illustrated as rows in FIGS. 3, 4, and 5). FIG. 3 illustrates an exemplary indexed data table of dynamic parameters utilized by a variety of service provider accounts. For example, each service provider may specify a different mode of activation. As the name implies, the mode of activation indicates the type of activation procedure that is employed by the particular service provider. The different types of activation procedures may include, for example, an Over-the-Air Service Provisioning (OTASP) procedure, an Internet Over-the Air (IOTA) procedure, or an Open Mobile Alliance Device Management (OMADM) procedure. Each of these procedures may implement different steps and/or protocols to accomplish the activation procedure.

The data table may also specify the Network Access Identifier (NAI) for each service provider. The NAI is the username assigned to the mobile device 10 used to authenticate the device for data service. Each service provider may assign a unique format to the username. For example, service provider 1 uses the service provider 1's name as the domain for each username. Alternatively, service provider 2 utilizes "hcm.SP2.com" as the domain name. In some instances a service provider may assign multiple NAIs to the same mobile device 10. For example, as shown in FIG. 3, Service Provider 2 and Service Provider 4 may assign multiple NAIs to the same mobile device 10. The format of the NAI may differ not only between the different service providers, but also between the various NAIs assigned by the same service provider. Also, as shown in FIG. 3, other service providers such as Service Provider 1 and Service Provider 3 may only assign a single NAI to each mobile device 10. The multiple NAIs may be distinguished by the MIP User Profile N, where N={0, 1, 2, 3, . . . }. Thus, while FIG. 3 depicts some service providers assigning two NAIs (i.e., N={0, 1}) additional user profiles may be assigned in some instances.

The data table may further specify the Mobile Node-Home Agent (MN-HA) Shared Secret, also referred to as a password. The MN-HA password may be used to authenticate the mobile device 10 at the Mobile IP Home Agent. Each service provider may assign a unique format to the username. For example, service provider 3 uses the first 16 digits of the Authentication Key (Akey), while service provider 4 uses an 8 character Psuedo ESN (pESN). As a further example, service provider 2 utilizes "hcm.SP2.com" as the domain name. Similar to the NAI, service providers may assign multiple MN-HA passwords to the same mobile device 10, such as shown in FIG. 3 for Service Provider 2 and Service Provider 4. Also, as shown in FIG. 3, other service providers such as Service Provider 1 and Service Provider 3 may only assign a single MH-NA password to each mobile device 10.

The data table may further specify the Mobile Node-Authentication, Authorization, and Accounting (MN-AAA) Shared Secret (password) which authenticates the mobile device 10 to the billing server (not shown). Again, each service provider may use a different specific format. Additionally, each service provider may utilize different values for each entry. Similar to the MN-HA password and NAIs, service providers may elect to assign multiple MN-AAA passwords to each mobile device 10.

In addition, the data table may specify other parameters and settings such as the Simple IP Authentication, Authorization, and Accounting NAI (SIP AAA NAI), which is sometimes referred to as the Simple IP Username. The data table may further specify the Simple IP Authentication, Authorization, and Accounting Password (SIP AAA password) which is a Simple IP password. Other parameters may include the Simple Parameter Index (SPI), not shown. It is noted that not all types of parameters and settings are used by all service providers. For example, while service providers 2 and 4 utilize a parameter for MN-HA Shared Secret—Slot 1, service providers 1 and 3 do not utilize such a parameter. For some service providers no value may be recorded in the indexed data table for such a non-utilized parameter. In other cases, a null value may be stored as a place holder for such a value.

FIG. 4 illustrates additional example data entries in the exemplary indexed data table beyond those shown in FIG. 3. For example, each service provider may specify a different mobile node authenticator (MN Authenticator). In the example shown in FIG. 4, only service provider 1 requires a value for this parameter. The data table of FIG. 4 also shows various formats or values specified by service providers for the Mobile Node Home Address SPI Set (MN HA SPI Set), MN HA SPI Value, MN AAA SPI Set, MN AAA SPI Value, Reverse Tunneling, QNC Enabled, Home Address, Primary HA Address, Secondary HA Address, Initial Registrations Retry Interval Time, Registry Retry Number, DS MIP De-registrations Retries, and Pre-Lifetime-expiry Re-Registration time.

FIG. 5 illustrates additional example data entries in the exemplary indexed data table beyond those shown in FIGS. 3 and 4. The data table of FIG. 5 also shows example formats or values that service providers may use for SPC, One Time Keypad Subsidy Lock (OTKSL), Number of Incorrect Service Programming Code (SPC) Attempts, Field Service Code, Akey Checksum, simple message service (SMS) support.

The parameters and settings listed in the indexed data tables shown in FIGS. 3, 4, and 5 are intended to be illustrative only and provide examples of possible formats and values utilized and implemented by different service providers. One of skill in the art would appreciate that service providers may employ several other parameters and settings utilized in their various software builds which may be reflected in the indexed data table.

When a user elects to initiate communications on a mobile device 10, the user may select a service provider account to support the communication by launching a connection manager (e.g., 60, 61, 62, 63) corresponding to the selected service provider account. In instances where the mobile device 10 is a cellular telephone, a service provider account is typically running at all times. However, in instances where the mobile device 10 is a wireless modem card within a notebook computer, a service provider account is typically not running unless communication capabilities are desired. In order to initiate communications, the user may launch a service provider's independent connection manager. Alternatively, the user may select a particular service provider from a choice of several service providers presented in a user interface display generated by a common connection manager. A similar menu may be provided on a cellular telephone to select a new service provider account which would be analogous to launching a connection manager on a notebook computer. By launching the connection manager (60, 61, 62, 63) corresponding to the desired service provider account, the connection manager (60, 61, 62, 63) communicates with the C-API 40, either directly or through a connection manager tracker 50, to call up each of the necessary subroutines contained in the DLL 45 necessary to complete the software build necessary for communications over the selected service provider network. In addition, the C-API 40 may access the DLL 45 to retrieve the necessary parameters stored in a non-volatile memory 25 and/or File System 26 via multi-interface module 30. The necessary parameters are stored in an indexed data table. That data table may contain each of the assigned parameters for a selected service provider account that have been previously generated during an initial service provider account activation procedure.

Referring back to FIG. 2, in some instances a mobile device 10 may be loaded with a variety of connection mangers (61, 62, 63) as part of an original equipment manufacturer's (OEM) software package. These connection managers (61, 62, 63) may be individual connection managers loaded on the mobile device or may be possible selections on a common connection manager program 60. In such instances, it is likely that a user has not established a service provider account with any/all of the service providers corresponding to each of the connection managers/selections. Therefore, the mobile device 10 may be provisioned with the default parameters as prescribed by the selected service provider only. Consequently, when a user launches a connection manager for a service provider that does not have a service provider account associated for the mobile device 10, an error will occur since the necessary parameters of a valid subscription will not be stored in the indexed data table. Accordingly, each time a connection manager/selection is launched, a test to determine whether an account has been activated for the selected service provider may be performed.

Figure 6:
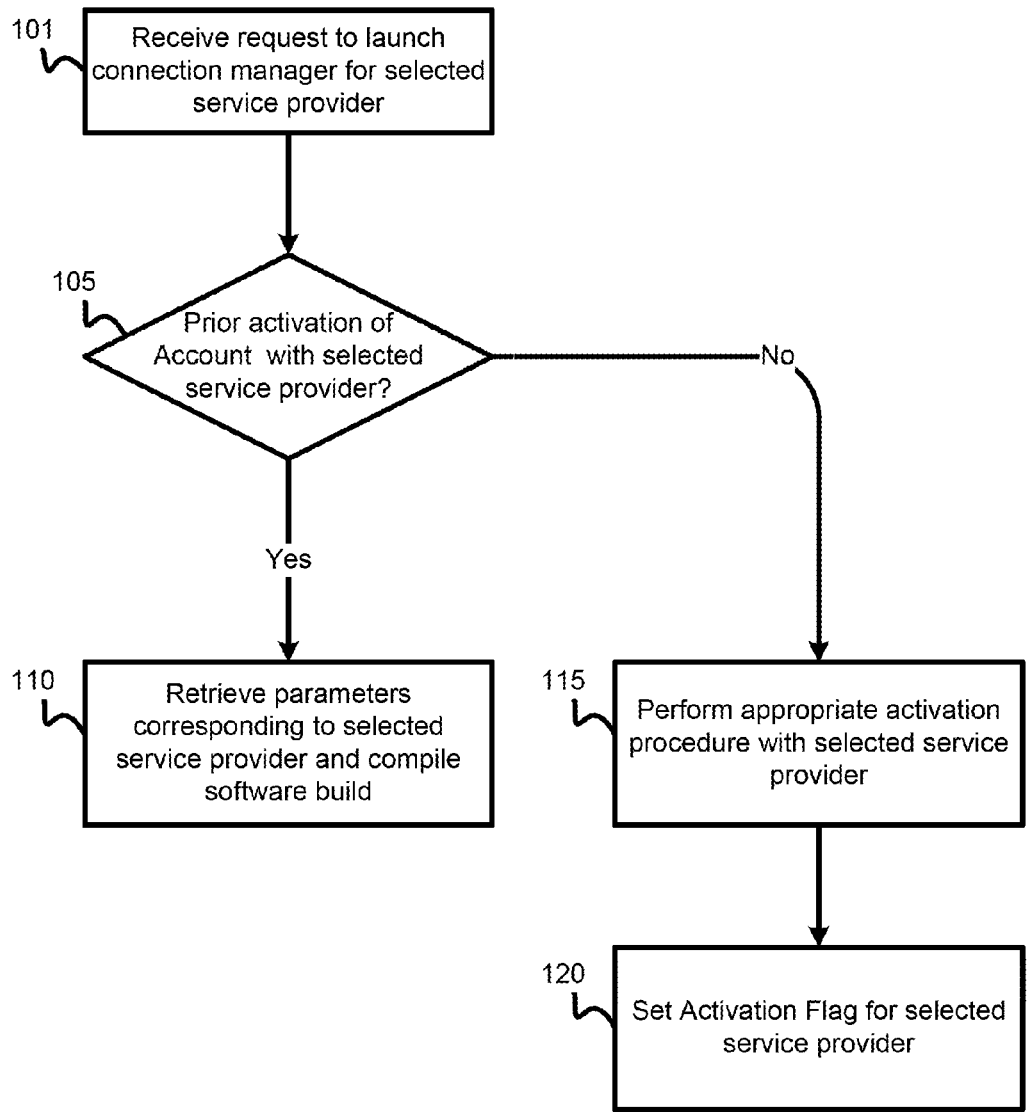
FIG. 6 is a process flow diagram illustrating example steps which may be implemented to insure that an account for a selected service provider has been activated.

FIG. 6 illustrates a process that may be implemented on a mobile device 10 each time a connection manager is launched to determine if an account on the selected service provider has been activated. When a user attempts to launch a connection manager for a selected service provider, the request is received by the processor 191, step 101. Upon receipt of a request to launch a connection manager for a selected service provider, the processor 191 may determine whether an account has previously been activated for the selected service provider, decision 105. This determination process may be accomplished by checking the status of an activation flag associated with each service provider. Alternatively, this determination may be accomplished by checking the parameter values stored in the indexed data table (see FIGS. 3-5) for the selected service provider. If the parameter values stored in the indexed data table are either absent or default values, it may be assumed that an activation procedure has not been completed. If the processor 191 determines that an account has been previously activated on the mobile device 10 (i.e., decision 105=Yes), then the processor 191 retrieves the parameter values stored in the indexed data table and implements these values while loading or compiling the software build corresponding to the selected service provider, step 110. If an account has been activated, then the selected connection manager may proceed to request the C-API 40 to call up the necessary subroutines in multi-interface module 30 via the DLL 45 and retrieve the stored parameters from the indexed data table in non-volatile memory 25 and/or file systems 26 to implement the appropriate software build.

If, however, the processor 191 determines that an account for the selected service provider has not been previously activated (i.e., decision 105=No), then the processor initiates the appropriate activation procedure in order to obtain all of the necessary software build parameters for the selected service provider, step 115. Once these parameter values have been obtained and stored to the indexed data table, an activation flag indicating that an account has been activated on the selected service provider may be optionally set, step 120.

When a mobile device 10 initially activates an account with a selected service provider, the type of activation procedure that is initiated will depend upon the selected service provider. Thus, the type of activation procedure required for each individual service provider may also be stored in the indexed data table. For example, some service providers may require that the mobile device 10 initiate an Over-the-Air Service Provisioning (OTASP) procedure, an Internet Over-the Air (IOTA) procedure, or an Open Mobile Alliance Device Management (OMADM) procedure.

In an OTASP procedure, the mobile device 10 may be directed to wirelessly call a specified number (e.g., *228). While the mobile device 10 may not have sufficient parameter data to conduct unlimited communications on a service provider's network, the mobile device 10 may be programmed by the OEM with sufficient parameter data to conduct limited communications to contact a selected service provider's activation server for initial activation purposes. Once connected to the service provider's activation server the mobile device 10 receives various parameter and settings from the service provider's activation server which are used to configure the appropriate software build on the mobile device 10. Some of the parameters and settings may include a mobile identification number (MIN), preferred roaming list (PRL), as well as mobile directory number (MDN) and mobile station identifiers (MSID) both of which may be referred to as the mobile device's phone number. Once the OTASP procedure is complete, the mobile device 10 may be required to initiate an authentication parameters generation procedure which authenticates the mobile device 10 to the service provider by generating usernames and/or passwords. Similarly, in an IOTA procedure, the mobile device may receive parameters and setting such as a MIN and MSID. However, rather than performing a separate authentication process, the IOTA process also generates and assigns passwords and usernames to the mobile device 10. Once either activation process is complete, the parameters and settings received during the activation procedure may be stored in the indexed data table in a non-volatile memory 25.

Figure 7:
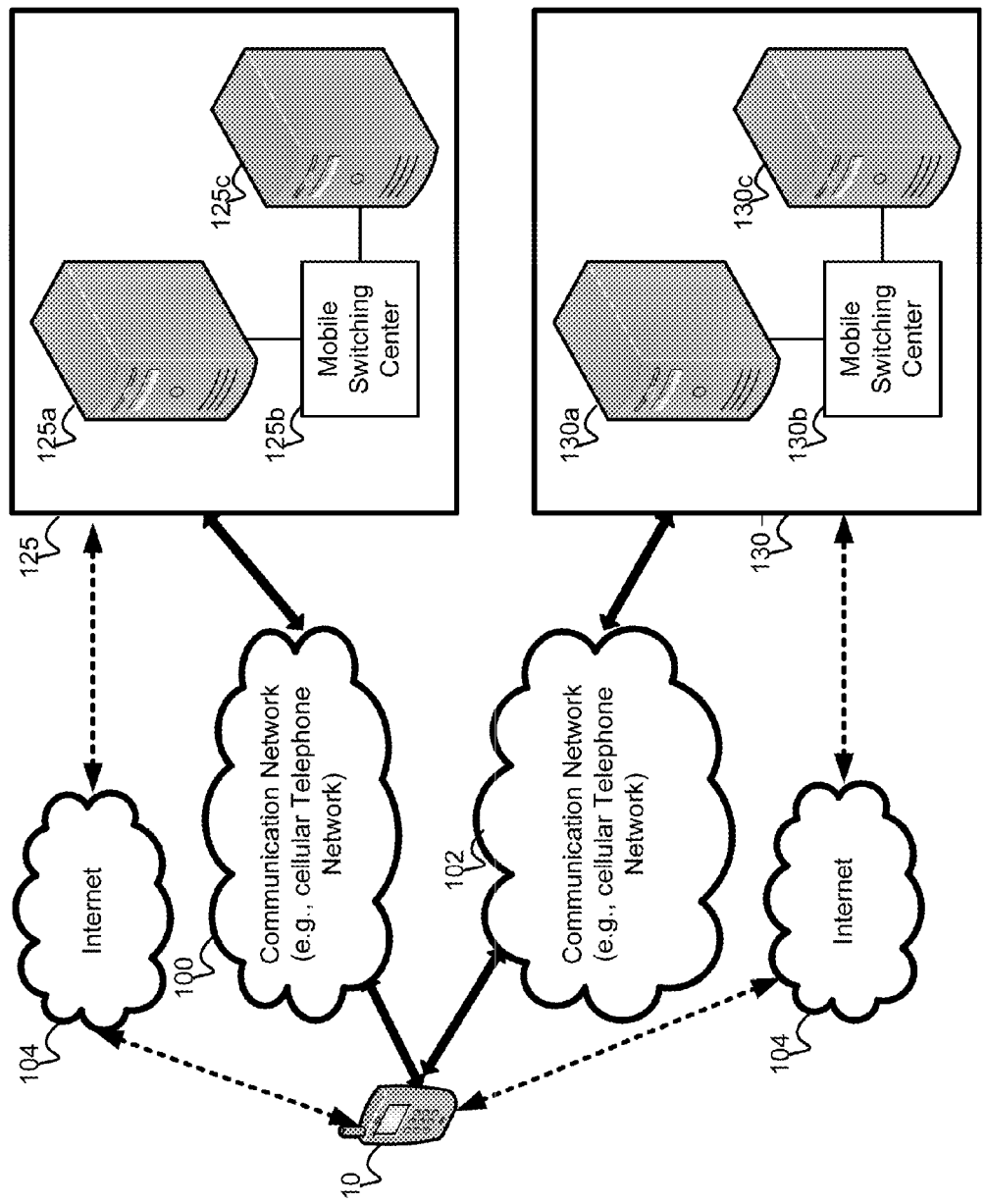
FIG. 7 is a system diagram of a communication system which allows a mobile device to initiate an activation procedure with a variety of service providers.

FIG. 7 illustrates an exemplary communication system which allows a mobile device 10 to initiate an activation procedure with a variety of service providers. FIG. 7 includes two service providers 125, 130 for illustrative purposes; a multitude of service providers may be included in the embodiment communication system. To initiate an activation procedure with a service provider wirelessly, the mobile device 10 must have sufficient software and provisioning data to access the service provider's communication network 100, 102 and connect with an activation server 125a, 130a. Accordingly, OEMs may load sufficient software and provisioning data to enable a mobile device to contact one or many service providers' activation server 125a, 130a. The activation servers 125a, 130a may be accessed by dialing a special numbers (e.g., *228) to initiate an OTASP/IOTA/OMADM procedure.

Alternatively, if the necessary minimum software and provisioning data is not loaded onto the mobile device 10 by the OEM, the mobile device 10 may connect through specified telephone numbers or website URLs maintained by a service provider's activation server 125a, 130a via wired connections through a wired communication network 104 to initiate activation procedures. Once connected to the service provider's activation server 125a, 130a the mobile device 10 may be connected through a mobile switching center 125b, 130b to the service provider's provisioning server 125c, 130c. As part of an activation process, the mobile device's 10 unique serial number, (e.g., mobile equipment identifier (MEID) and international mobile equipment identifier (IMEI)), may be transmitted to the service provider's provisioning server 125c, 130c for association with an account with the selected service provider. In return the service provider provisioning server 125c, 130c may transmit various parameters and settings necessary to operate on the service provider network. Alternatively, the service provider provisioning system may communicate with an external server to obtain the parameters or vice-versa. Such parameters and settings may be stored in the indexed data table in the non-volatile memory 25. In addition, a DLL 45 containing necessary subroutines for the selected service provider's software build may be transmitted to the mobile device 10.

Once the mobile device 10 has received all of the necessary parameters, settings and DLL 45 from the service provider provisioning server 125c, 130c, a connection manager for the selected service provider may be launched in the mobile device's processor 191. In case of modules embedded in computers or add-on cards, the connection manager may be launched in the computer in which the module is embedded or to which the module is connected. As discussed above, the launched connection manager may point to the corresponding software build file in memory. The software build file may contain all of the necessary instructions and subroutines required to compile the completed software build. The software build file may recall the necessary subroutines found in the DLL 45 and parameters associated with the selected service provider found in the indexed data table which is stored in a non-volatile memory 25 to modify the behavior of the appropriate software build to conduct communications over the selected service provider's communications network.

Figure 8:
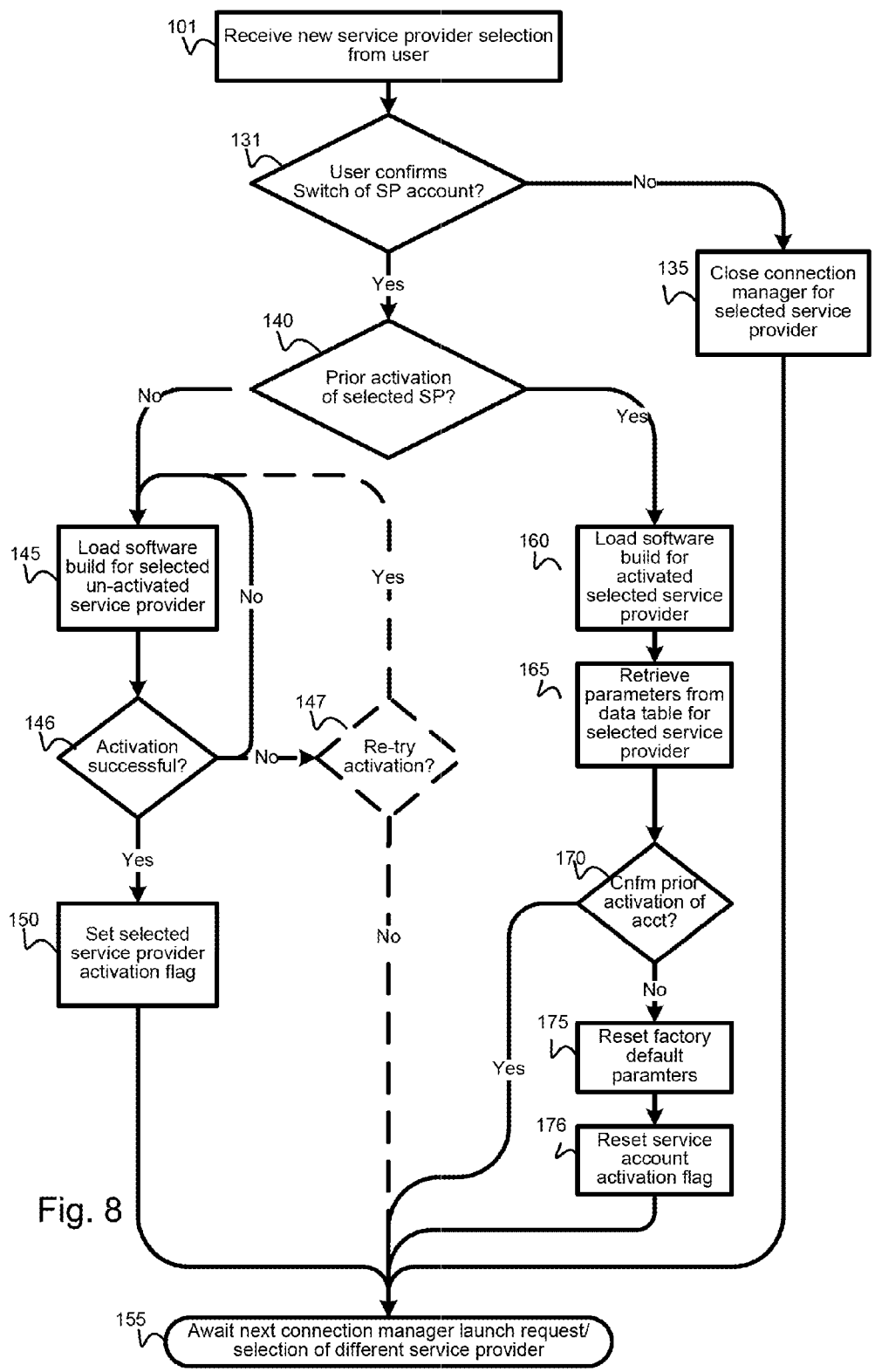
FIG. 8 is a process flow diagram illustrating an embodiment process for seamlessly enabling multiple software builds to support a multiple service provider accounts on the same mobile device.

FIG. 8 is a process flow diagram of embodiment steps for re-programming the mobile device 10 with a different software build to change service provider accounts. When a user elects to initiate communications on a mobile device 10, the user may select a service provider account to support the communication by launching a connection manager (e.g., 61, 62, 63) corresponding to the selected service provider account. In instances where the mobile device 10 is a wireless telephone, a service provider account is typically running at all times. Thus, a menu may be presented on a user interface display to prompt the user to select a new service provider. In a response to the menu display, the processor 191 may receive a request from the user to switch to a new service provider account, step 101. For example, a request to switch to a new service provider account may be received when a new connection manager is launched by a user action or a different service provider is selected by a user from a common connection manager. The processor 191 may optionally present a display requesting the user to confirm that the user intends to switch service provider (SP) accounts, decision 131. By confirming the user's intention, unwanted or unintentional changes to the software build currently implemented on the mobile device 10 may be avoided If the user responds to the inquiry in the negative (i.e., decision 131=No), then the processor 191 closes the launched connection manager (61, 62, 63) or deselects the connection manager from the common connection manager 60, step 135. Once the connection manager is closed or deselected, the processor 191 may await the next connection manager launch request or selection of a different service provider step 155.

If the user confirms an intention to switch service provider accounts (i.e., decision 131=Yes), the processor 191 determines if an account with the selected service provider has been previously activated, decision 140. In an embodiment, a flag may be set in memory if an account has been previously activated on a selected service provider. This flag may be separately recorded in an indexed data table of service provider software parameters. Other indicators beside a flag may be used to indicate whether an account with the selected service provider has been previously activated. For example, in an alternative embodiment the processor 191 may check the format of the mobile identification number (MIN) stored in the indexed data table of service provider software parameters. The MIN is a 10-digit number unique to each mobile device which a service provider uses to identify individual mobile devices. Typically, after an account is activated with a service provider the MINs format will be altered from its original manufacturer format of 000-000-WXYZ. If the original manufacturer format exists, then no previous account has been activated on the mobile device 10.

If an account with the selected service provider has not been previously activated (i.e., decision 140=No), then the processor 191 loads the software build for the un-activated selected service provider, step 145. Once the software build is loaded, the mobile device 10 may attempt activation on the selected but previously un-activated service provider network. If the activation was successful (i.e., decision 146=Yes), then a flag may be set indicating that an account with the selected service provider has been activated, step 150. After setting the flag indicating that an account with the selected service provider has been activated, a call may proceed and the processor 191 may await the next connection manager launch request or selection of a different service provider, step 155. If the activation in step 145 was not successful (i.e., decision 146=No), then the processor 191 may repeat step 145 (see also process flow diagram illustrated in FIG. 9) in an attempt to successfully activate an account for the selected but previously un-activated service provider. In an alternative embodiment, the processor 191 may inform user of the failed activation attempt and inquire whether the user wishes to repeat the activation attempt, step 147. If the user elects to continue activation attempts (i.e., decision 147=Yes), then the processor repeats step 145 (see also process flow diagram illustrated in FIG. 9) in an attempt to successfully activate an account for the selected but previously un-activated service provider. However, if the user elects to cancel the activation attempt (i.e., decision 147=No), then the processor 191 may await the next connection manager launch, or selection of a different service provider, step 155.

In an alternative embodiment where the processor 191 may check the format of the mobile identification number (MIN) stored in the indexed data table of service provider software parameters to determined whether an account has been previously activated (i.e., decision 140), the MIN's format will have already been altered from the original manufacturer format during the software build load step 145. Accordingly, step 150 will not be necessary.

If the processor 191 determines that an account with the selected service provider has been previously activated (i.e., decision 140=Yes), then the processor 191 may load the selected service provider's software build, step 160. Once the software build is loaded, the processor 191 retrieves from non-volatile memory the various parameters and settings previously stored in the indexed data table of service provider accounts, step 165. In some instances it may be the case that while an account was previously activated on the mobile device 10 for the selected service provider, the activated service provider account may have lapsed or been abandoned. This may occur, for example, when trial subscriptions for service are offered or a user temporarily elects to no longer utilize the selected service provider to support calls. Accordingly, it may be necessary to confirm that an account is still active/valid for the selected service provider.

In an embodiment, the processor 191 may request the user to confirm that a prior account on the selected service provider was previously active and that the user wishes to switch to this previously activated account, decision 170. If the user confirms that a prior account on the selected service provider was previously active and that the user wishes to switch to this previously activated account (i.e., decision 170=Yes), the processor 191 implements the selected service provider account to support its data calls and awaits the next connection manager launch request or selection of a different service provider, step 155.

In some instances a user may have previously activated an account with the selected service provider, but has either intentionally or unintentionally abandoned the previously activated service provider account. Thus, in the case of intentional abandonment, the user may indicate that a previously activated service provider account is no longer active (i.e., decision 170=No). Alternatively, in the case of unintentional abandonment, the user may simply not know whether an account on the selected service provider account is active. Therefore, if the user does not confirm a desire to switch to the previously activated account (i.e., decision 170=No), the processor 191 completes a process of loading a software build for a previously un-activated service provider. Since many service providers expect a mobile device 10 to be used with a single service provider, some service provider software builds expect the mobile device 10 to be set to its original factory default settings and parameter values. Therefore, the processor 191 may reset the mobile device 10 to its original factory default setting and parameter values, step 175. Once the mobile device 10 has been reset to the original factory default settings and parameter values, the processor 191 resets the flag used in decision 140 indicating previous activation with the selected service provider, step 176, so that the activation status for the selected service provider is cleared when the account active status is undetermined (i.e., an account with the selected service provider has been activated (decision 140=Yes), but the user has failed to confirm activation (decision 170=No)). Resetting the flag indicating that an account with the selected service provider has been previously activated will require the user to activate an account with the selected service provider the next time the service provider is selected. This is because the next time the processor reaches decision 140 the reset flag will create a No output. One of skill in the art may appreciate that the end user may have to contact customer service of the selected service provider for activation/reactivation, if needed.

In an alternative embodiment where the processor 191 checks the format of the mobile identification number (MIN) stored in the indexed data table of service provider software parameters step 176 may be unnecessary as such embodiments do not utilize such a flag. In addition, since step 175 previously reset the mobile device to its original factory settings and defaults the MIN entry for the selected service provider stored in the indexed data table will reset back to its original manufacturer format of 000-000-WXYZ. Consequently, in the alternative embodiment the user will be required to activate an account with the selected service provider the next time the service provider is selected.

Once the software build is loaded and the factory default parameters are reset (step 175) and the any necessary resetting of flags, deletion of data or resetting of MIN (step 176), the processor 191 implements the selected service provider account to support its data calls and awaits the next connection manager launch request or selection of a different service provider, step 155.

Alternative embodiments for confirming whether an account for the selected service provider is currently active and capable of supporting calls are described in more detail below with respect to FIGS. 11 and 12.

Figure 9:
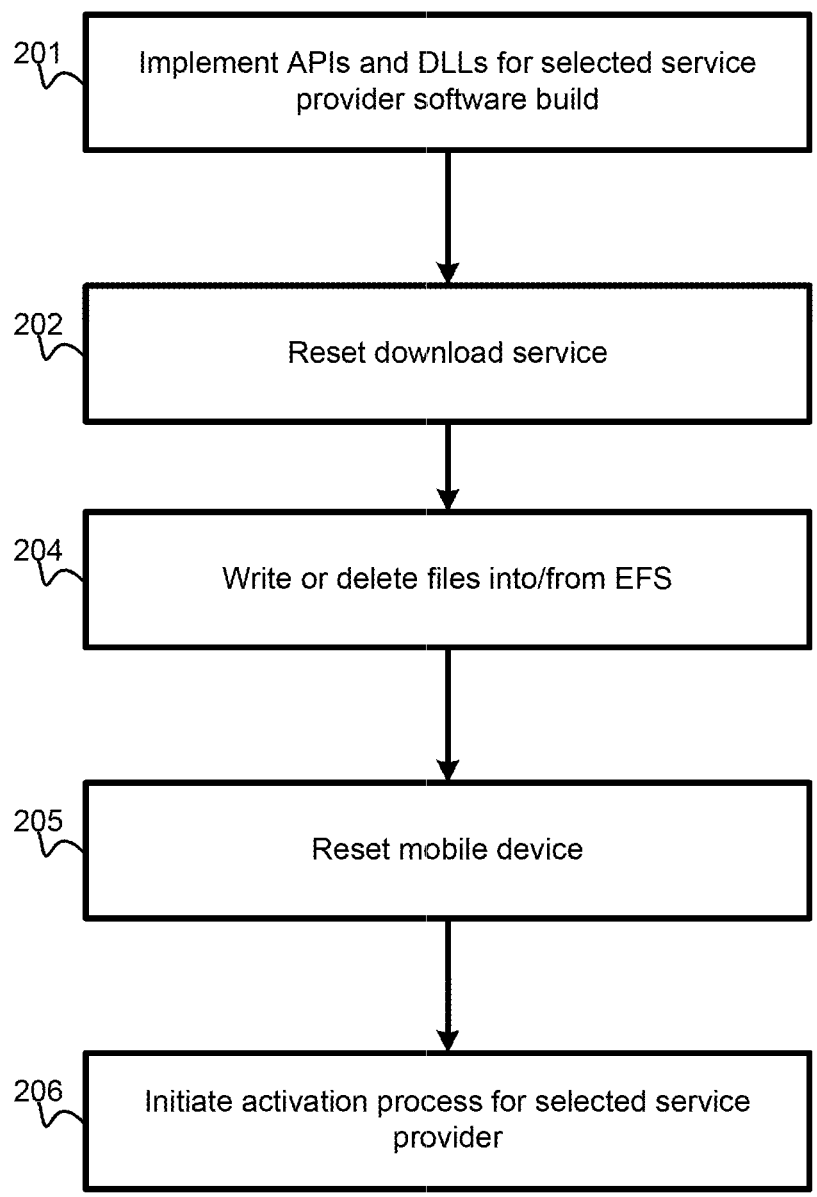
FIG. 9 is a process flow diagram illustrating example steps which may be implemented to load the software build for a previously un-activated service provider account.

FIG. 9 is a process flow diagram illustrating example steps which may be implemented to load the software build for a previously un-activated service provider account (step 145 in FIG. 8). Once a particular service provider is selected (step 101 of FIG. 8), the processor 191 implements the necessary APIs and DLLs for the selected service provider, step 201. As a mobile device 10 performs an activation procedure with various service providers to set up an account, the software builds associated with each service provider may be stored in memory for subsequent retrieval. The software builds may be setup in directories such that the processor may quickly locate the appropriate software build file for quick and efficient retrieval. For example, each new build may be stored in the mobile device memory 192 with a filename that differs from one another by service provider name and/or account name. Because the stored software builds are for previously un-activated service provider accounts, all of the parameters and settings stored with the software builds are default parameters and settings. These default parameters and settings should be in accordance to service providers' requirements. The default parameters and settings may be updated during the activation process. In addition when the processor implements the necessary APIs and DLLs for the selected service provider (step 201), the processor 191 may also perform additional procedures specific to each service provider to ensure that the software build and parameters are successfully loaded into the device.

Once the new software build has been located and retrieved, the download service is reset, step 202. In an embodiment, the download service reset process may be a Windows(g service restart. The download service may be stopped and restarted by an API call. The download service may read a configuration file. The configuration file may contain the path to the software build for a particular service provider, and other files needed by the mobile device 10 to operate on that service provider's network. The download service may read this configuration file on restart. Accordingly, the download service may be required to be reset/restarted (step 202) so that the new changes in the configuration file may take effect.

Next the necessary files may be written into or deleted from the extended file service (EFS), step 204. The necessary files may be stored in the multi-interface module 30 during initial production of the mobile device 10, incorporated into the software build package, incorporated in a connection manager tracker application, or incorporated into a common connection manager installation package. As the software build for each new service provider account is loaded, the EFS files of the previously selected service provider account are deleted or replaced with those of the newly selected service provider account. Once the necessary files are written into or deleted from the EFS, the mobile device 10 may be reset so that the new changes take effect, step 205. With the mobile device 10 reset, the activation process for the selected service provider is initiated so that the appropriate parameters and settings may be obtained to complete the implementation of the software build, step 206. One of skill in the art would appreciate that in some instances a service call to a technician or operator for the selected service provider may be required to initiate the activation process. Once the activation process is complete, the mobile device 10 is capable of supporting communication over the newly selected service provider's network.

Figure 10:
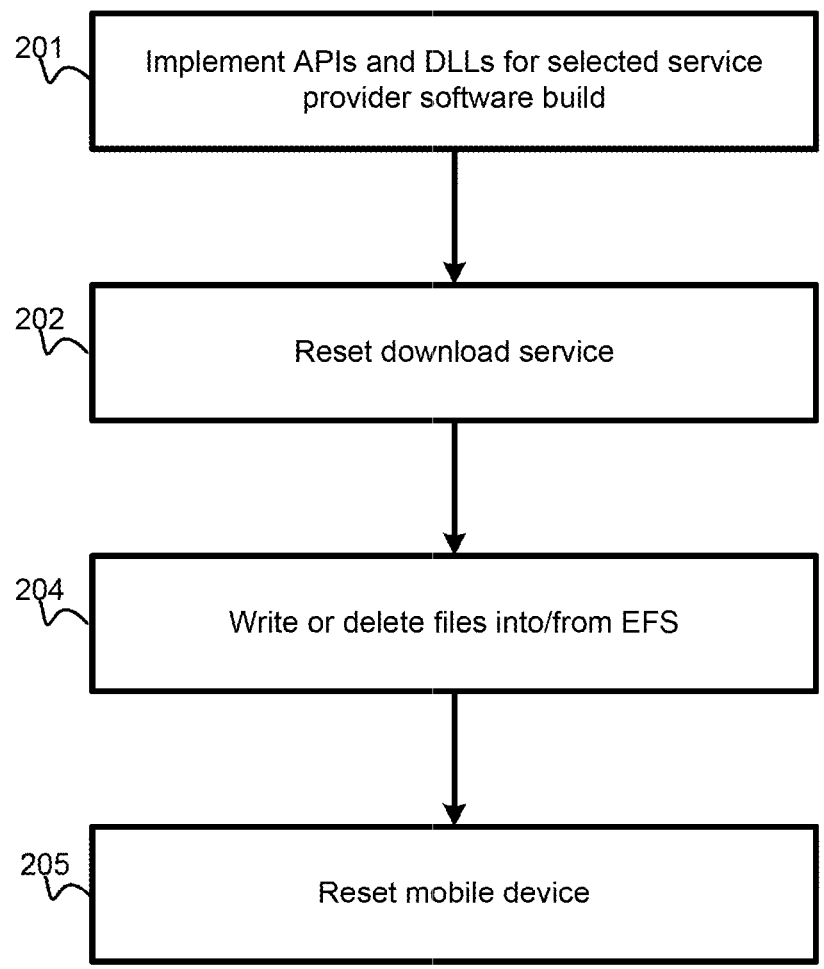
FIG. 10 is a process flow diagram illustrating example steps which may be implemented to load the software build for a previously activated service provider account.

FIG. 10 is a process flow diagram illustrating example steps which may be implemented to load the software build for a previously activated service provider account (step 160 in FIG. 8). The process to load the appropriate software build for a previously activated service provider account is similar to the process for loading an appropriate software build for a previously un-activated service provider account. Once a particular service provider is selected (step 101 of FIG. 8), the processor 191 implements the necessary APIs and DLLs for the selected service provider, step 201. The processor 191 may also perform additional procedures specific to each service provider to ensure that the software build and parameters are successfully loaded into the device. Once the new software build has been located and retrieved, the download service is reset, step 202. In an embodiment, the download service reset process may be a Windows® service restart. The download service may be stopped and restarted by an API call. The download service may read a configuration file. The configuration file may contain the path to the software build for a particular service provider, and other files needed by the mobile device 10 to operate on that service provider's network. The download service may read this configuration file on restart. Accordingly, the download service may be required to be reset/restarted (step 202) so that the new changes in the configuration file may take effect. Once the download service has been reset (step 202), the processor 191 writes into or deletes from the EFS all necessary files for the pointed software build. Once the necessary files are written into or deleted from the EFS, the mobile device 10 is reset so that the new changes take effect, step 205. With the mobile device 10 reset, the mobile device 10 is capable of supporting communication over the newly selected service provider's network. In contrast to the process flow shown in FIG. 9 and described above, since the mobile device 10 has previously activated an account with the selected service provider there is no need to initiate the activation process for the selected service provider (step 206).

In many instances, when asked, a user may incorrectly confirm the prior activation of the selected service provider account (i.e., decision 170=Yes). Put another way, many users may not accurately know the status of each possible service provider account previously activated on their mobile device 10. For example, a user may have knowingly or unknowingly activated a trial subscription with a particular service provider. In either instance, the user may not know that the trial subscription has expired, but the parameters in the mobile device 10 will have been altered to indicate prior activation with the selected service provider despite the absence of an active/valid service provider account to support calls on the selected service provider's network. Consequently, when the mobile device 10 performs the process flow shown in FIG. 8, the mobile device 10 will attempt to load the software build for the previously activated service provider, but no call will be supported by the selected service provider's network because there is no active/valid account to support the call. This may lead to an unpleasant user experience and frustration by the user to initiate or receive a call through the selected service provider network.

Although the use of an optional flag set and stored in memory to indicate whether an account with the selected service provider has been previously activated may be implemented, such flags may be unreliable to indicate whether an account with the service provider is still active/valid. This is particularly the case where a previously activated account has not been explicitly abandoned or lapsed. Accordingly, other alternative embodiments may be necessary to confirm whether an account with the selected service provider has been activated and is still active/valid.

Figure 11:
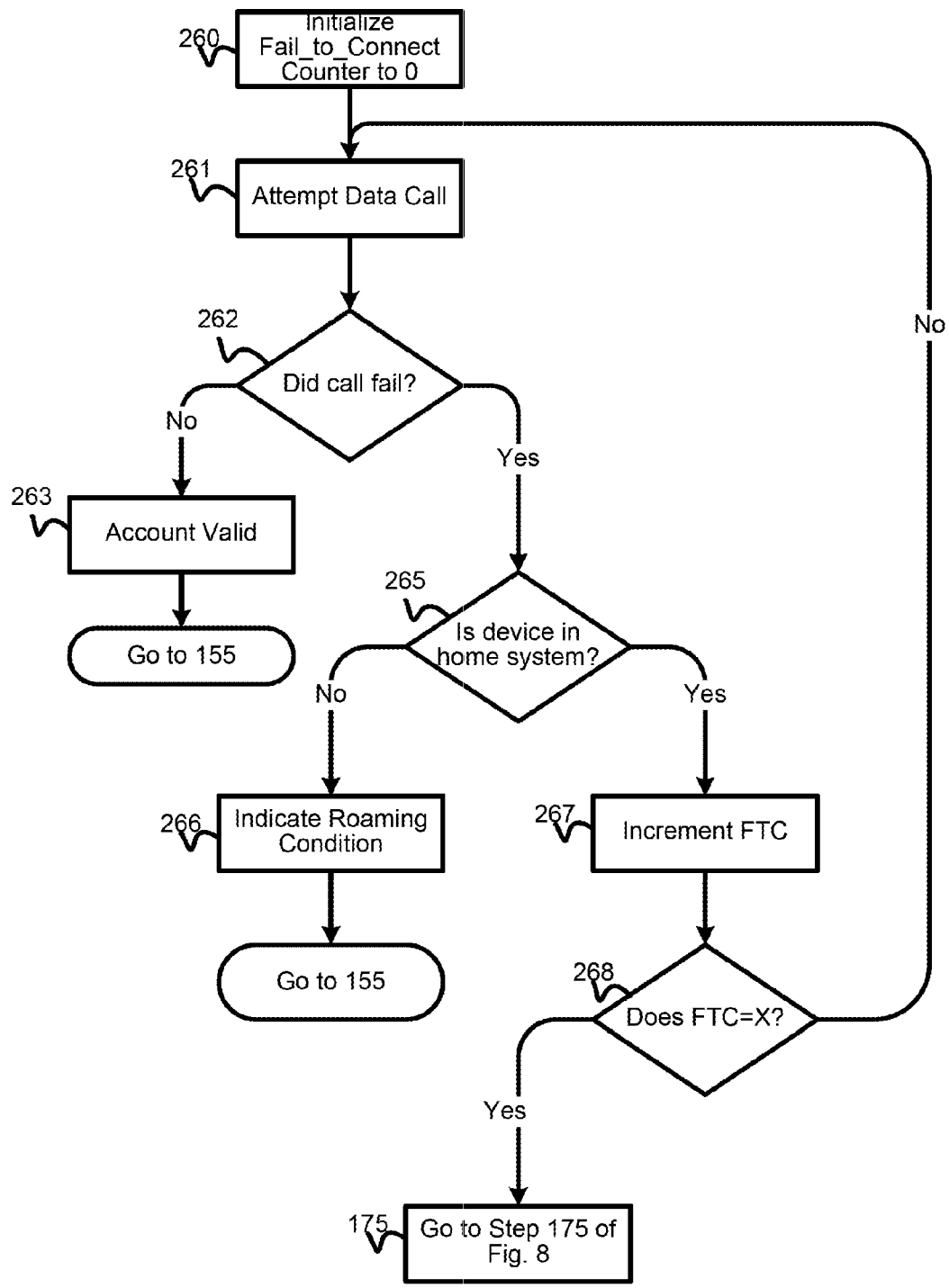
FIG. 11 is a process flow diagram of an alternative embodiment method to confirm an active/valid account with the selected service provider.

FIG. 11 is a process flow diagram of steps that may be implemented to automatically confirm and/or create an active account on with the selected service provider. The steps shown in the process flow of FIG. 11 may be performed to derive the decision of decision 170 in FIG. 8. The process flow begins by initializing a "Failure to Connect" counter by setting the counter to zero, step 260. The mobile device 10 may then attempt to make a data call, step 261, and determine whether the data call was successful or failed, decision 262, where "fail" is an authentication failure. The most common form of failure may be a Windows Dial-Up Network Connection (DUNC) error 691. If the call did not fail (i.e., decision 262=No), then the service provider account is deemed to be valid, step 263, and calls may be accordingly supported by the selected service provider network using the active/valid account. Thus, the processor may move onto step 155 to await the next connection manager launch request or selection of a different service provider.

However, if the data call is deemed to have failed (i.e., decision 262=Yes), then the processor 191 may determines if the mobile device 10 is currently within range of the selected service provider's home system, decision 265. If the mobile device 10 is not currently within range of the selected service provider's home system (i.e., decision 265=No), the processor 191 may presume that the mobile device 10 is in a roaming state and may indicate the roaming condition to the user. Since many if not all service provider's do not support roaming data calls, the mobile device's 10 roaming condition may prevent the data call from being successful. Thus, explaining the reason for the failed call attempt. The user may have to either wait until the mobile device 10 is moved within range of the selected service provider's home system or select a different service provider to support the call. Once the roaming condition is indicated to the user, the processor 191 may move onto step 155 to await the next connection manager launch request or selection of a different service provider.

Assuming an active/valid account on the selected service provider, the attempted call should be successful provided the mobile device 10 is within the range of the selected service provider's home system. Therefore, if the processor determines that the mobile device 10 is in range of the selected service provider's home system (i.e., decision 265=Yes), but the data call failed (i.e., decision 262=Yes), the processor 191 may increment the FTC counter, step 267, and determine if the FTC counter is equal to some predetermined value "X", decision 268. The value of X is arbitrary and may be selected such that the number of attempts to make a data call does not exceed an unreasonable number. If the FTC counter does not equal X (i.e., decision 268=No), the processor 191 may attempt to make another data call, step 261.

However, if the FTC counter does equal X (i.e., decision 268=Yes), meaning the number of attempts equals the "not to exceed" value then it is likely that the service provider account corresponding to the loaded software build is no longer active. Therefore, a new service provider account should be activated. Accordingly, when the FTC counter equals X (i.e., decision 268=Yes) then the factory default parameters may be reset as in step 175 of FIG. 8. Subsequently, the process flow shown in FIG. 8 (i.e., steps 176 and 155) may be implemented to load and activate a software build for the selected service provider.

Figure 12:
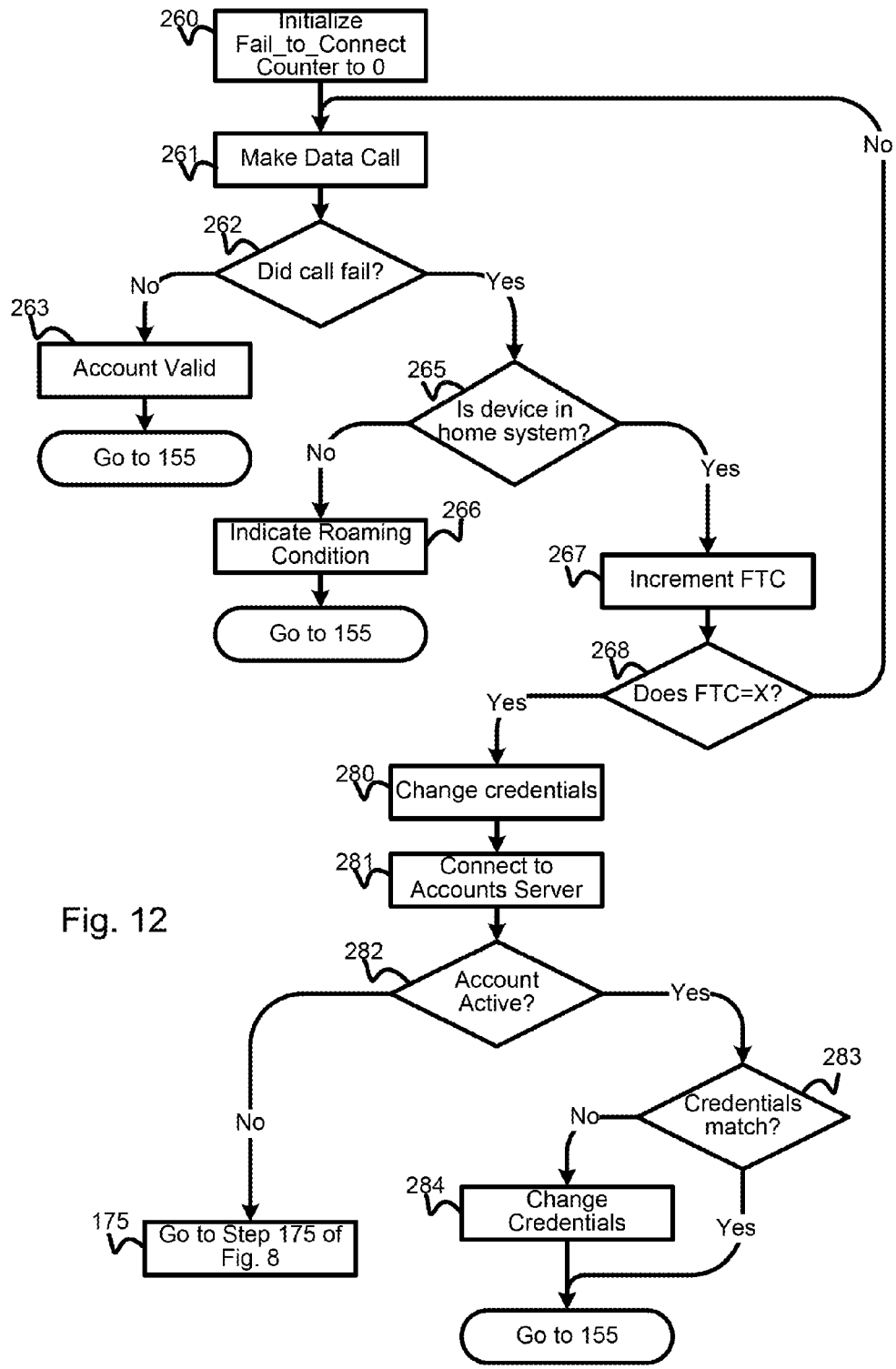
FIG. 12 is a process flow diagram of another alternative embodiment method to confirm an active/valid account with the selected service provider.

FIG. 12 is a process flow diagram of an alternative embodiment method to confirm an active/valid account with the selected service provider. The method illustrated in FIG. 12 is similar to the method shown in FIG. 11 and performs steps 260-268 in the same manner as described above with reference to FIG. 11. However, in FIG. 12 when the FTC counter equals the arbitrary value "X" (i.e., decision 268=Yes), the processor 191 changes the credentials (MIN, MDN, MIP Profile, Passwords etc) stored in the memory 25 or file system 26 to "boot strap" credentials, step 280. The boot strap credentials are known working credential values for each known service provider. The boot strap credentials for each known service provider may be loaded into the mobile device's EFS by an OEM or during mobile device initialization. The boot strap credentials for the selected service provider are retrieved from EFS and written into the non-volatile memory.

In addition, the credential values/settings (actual password) currently existing in the mobile device's non-volatile memory are stored in a temporary file created in EFS. By changing the credential values stored in non-volatile memory to the boot strap values for the selected service provider, the mobile device can be assured to have known working credential values stored in non-volatile memory that will allow the mobile device to complete a data call to at least an accounts server 180 (discussed in more detail below with reference to FIGS. 13 and 14). Once the accounts server 180 is contacted, information regarding all active accounts supporting the mobile device 10 may be determined.

While changing the credential values stored in non-volatile memory will allow a call to at least the accounts server 180, a routine will be required to repair the settings in the mobile device. In the embodiment process flow shown in FIG. 12, as part of the process to change the mobile device's credentials, the processor 191 may create a copy of all the existing credentials. Once the processor 191 has created a copy of all the existing credentials, the processor 191 may direct the mobile device 10 to connect to the accounts server 180 (see FIGS. 13 and 14), step 281. The accounts server 180 may be in connection with each service provider's Operator Home Location Register/Authentication, Authorization, and Accounting (HLRWAAA) server (not shown). By connecting to the selected service provider's Operator HLR/AAA server, the accounts server 180 may determine if an account on the selected service provider is active/valid for the mobile device 10 in question, decision 282. If an account with the selected service provider is active (i.e., decision 282=Yes), then the processor 191 may check the previously existing credentials which have been copied and stored in a temporary file in the EFS with the credential values stored for the selected service provider account in the selected service provider's HLR/AAA to determine a match, decision 283. Any distinctions between the credentials stored in the temporary file and those stored for the selected service provider account in the selected service provider's HLRWAAA may be the cause for the failed data call attempt. If the credentials stored in the temporary file in the EFS match those stored in the selected service provider's HLRWAAA server (i.e., decision 283=Yes), then it is likely that another some temporary external interference or cause exists for the failed data call attempt. Accordingly, the selected service provider account will likely be able to support a data call after some passage of time or movement of the mobile device. Consequently, the processor may move to step 155 to await the next connection manager launch request or selection of a different service provider. If however, a discrepancy between the credentials stored in the temporary file in the EFS and those stored in the selected service provider's HLR/AAA server exists (i.e., decision 283=No), then the credentials stored in the selected service provider's HLR/AAA server may be written into the non-volatile memory of the mobile device 10, step 284. After the credentials stored in the mobile device's non-volatile memory are updated to those credential values stored in the selected service provider's HLR/AAA server, the processor 191 may return to step 155 to await the next connection manager launch request or selection of a different service provider.

In other alternative embodiments (not shown), other repair routines may implemented which involve network initiated sessions for known activation methods such as OTAPA or Network Initiated IOTA to correct the mobile device credentials. Such alternative embodiment repair routines may also involve asking the end-user to perform known end-user initiated activation methods to repair issues with the mobile device. One of skill in the art would appreciate that various provisions in OTASP, OTAPA, IOTA and OMADM allow specific parameters to be written to the mobile device which may repair the mobile device and subsequently allow proper usage.

Figure 13:
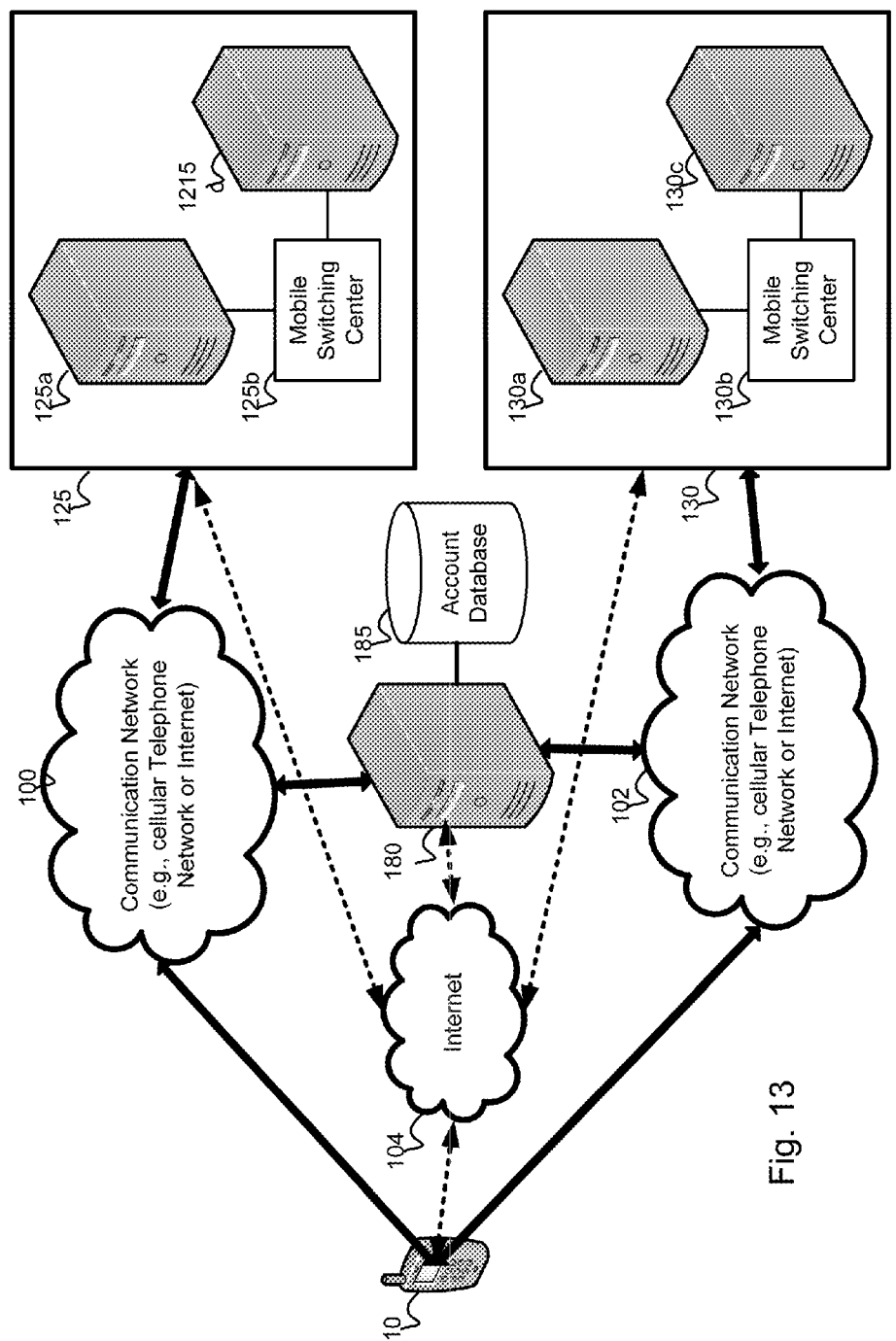
FIG. 13 is a system diagram of an alternative embodiment communication system in which an indexed data table of service provider accounts is stored in a remote non-volatile memory.

However, if an account with the selected service provider has not been previously activated (i.e., decision 282=No), then it is likely that the service provider account corresponding to the loaded software build is no longer active. Therefore, a new service provider account should be activated. Accordingly, if the selected service provider account is not active (i.e., decision 282=No) then the factory default parameters may be reset as in step 175 of FIG. 8. Subsequently, the process flow shown in FIG. 8 (i.e., steps 176 and 155) may be implemented to load and activate a software build for the selected service provider The indexed data table of service provider accounts may be stored in a non-volatile memory 25 contained within the communication module 20 for retrieval by the processor 191. In an alternative embodiment, the contents of the non-volatile memory may be remotely located. FIG. 13 illustrates an embodiment system wherein the indexed data table of service provider accounts may be stored in a remote data server. As described above with reference to FIG. 7, a mobile device 10 may communicate with a plurality of service providers 125, 130 to receive the necessary parameters, settings and provisioning data via communication networks 100, 102. Alternatively, if the necessary minimum software and provisioning data is not loaded onto the mobile device 10 by the OEM, the mobile device 10 may connect through specified telephone numbers or website URLs maintained by a service provider's home address server 125, 130 via wired connections through a wired communication network 104 to initiate activation procedures.

Referring to FIG. 13, the mobile device 10 may transmit the received data to an account server 180 for storage in an account database 185 in communication with an account server 180 or a non-volatile memory unit within the account server 180 via the communication networks 100, 102 or Internet 104. Each of the various parameters, settings and provisioning data received from the service provider (125, 130) may be stored for each individual mobile device 10 in communication with the account server 180. For example, the account database 185 or non-volatile memory unit within the account server 180 may store an account data table which may be an indexed accounts data table for all mobile devices serviced by the account server 180. Each individual mobile device may be identified in the indexed accounts data table by the mobile device's phone number, unique serial number (such as mobile equipment identifier (MEID) or international mobile equipment identifier (IMEI)) or some other designation such as a generated account name, or user customized account name. For each mobile device entry in the indexed accounts data table, an indexed data table record such as illustrated in FIGS. 3-5 may be stored. In this manner, the account server 180 maintains a record of the various parameters, settings and provisioning data that a particular mobile device 10 serviced by the account server 180 has previously generated. By storing the parameters, settings and provisioning data in a remote database, the local memory requirements of the mobile device 10 may be dramatically reduced. In addition, the remote storage of the parameter, setting and provisioning data may provide a degree of security to prevent unfettered access to a user's parameters, setting, and provisioning data in the event the mobile device 10 is stolen or inappropriately acquired. This is also useful for cases when a user voluntarily replaces the mobile device 10. The transfer of service provider accounts data to the new mobile device 10 is easier to accomplish with remotely stored credentials.

Figure 14:
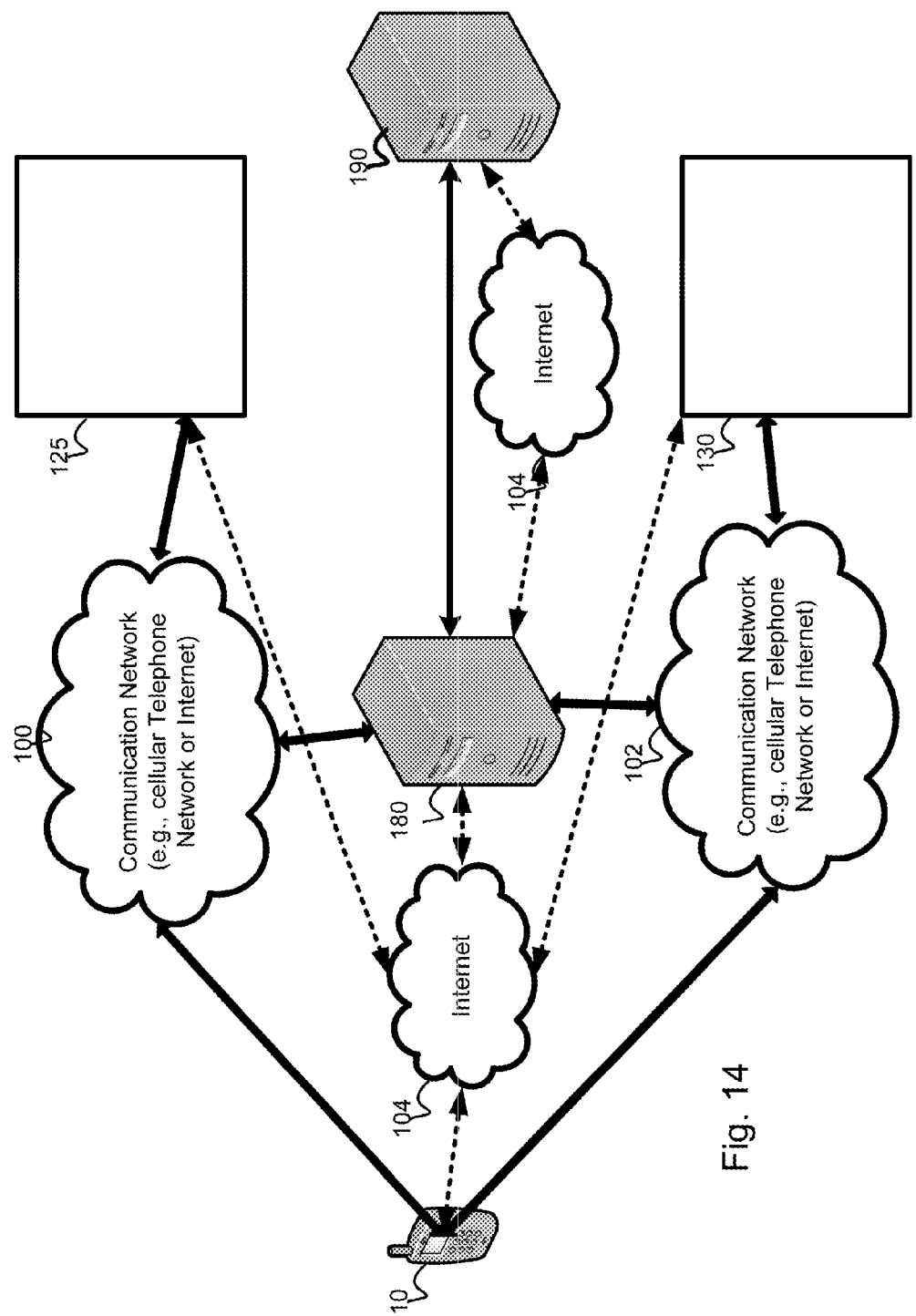
FIG. 14 is a system diagram of another alternative embodiment communication system in which the indexed data table of service provider accounts is stored in a remote non-volatile memory.

FIG. 14 illustrates another alternative embodiment system wherein the indexed data table of service provider accounts is stored in a remote server location. As each software defined radio based chipset module is manufactured, it is assigned a unique serial number (MEID or IMEI) by the manufacturer. Typically, the manufacturer maintains a listing of these serial numbers in a manufacturer server 190 or in an accompanying database (not shown separately). An accounts server 180 may be in communication with the manufacturer server 190 to obtain the listing of the manufactured software based radio chipsets serial numbers. These serial numbers in the listing may be used to identify individual mobile devices in an indexed accounts data table. The communication link between the accounts server 180 and the manufacturer server 190 may be via a hardwired direct link, via the Internet 104, or via a wireless communication link 100, 102. When a mobile device 10 launches an initialization procedure with a service provider 125, 130, the mobile device's unique serial number may be sent to the service provider 125, 130 so that the service provider may monitor network usage of each individual mobile device 10. In return the selected service provider 125, 130 may transmit the necessary parameters, settings and provisioning data to the mobile device 10. Alternatively or in addition, the parameters, settings and provisioning data transmitted to the mobile device 10 may be transmitted to the accounts server 180 for remote storage in an indexed data table. The accounts server 180 may store the parameters, settings, and provisioning data in an indexed accounts data table record for each mobile device 10 serviced by the account server 180. By storing the parameters, settings and provisioning data in a remote database, the local memory requirements of the mobile device 10 may be dramatically reduced. In addition, the remote storage of the parameters, settings and provisioning data may provide a degree of security to prevent unfettered access to a user's parameters, settings, and provisioning data in the event the mobile device 10 is stolen or inappropriately acquired. Further, in embodiments where the parameters, settings and provisioning data are sent directly to the accounts server 180 and then subsequently downloaded to the mobile device 10 as needed, processing power and battery life may be conserved. In addition, by storing each of the various parameters, settings and provisioning data for each of the service provider accounts activated by the mobile device 10 in a central location, a processor may quickly and efficiently keep track of which service providers have been activated on a particular mobile device 10.

As previously discussed, it may be important for a mobile device 10 to track which connection manager is currently operating and to insure that a subsequent connection manger is not launched until the currently operating connection manager is closed. This is because the launching of a subsequent connection manager while a current connection manager is currently operating may cause fatal collisions and a shutdown of the mobile device processor 191. Accordingly, a connection manager tracker 50 may be included to provide the necessary process to insure that two connection managers are not simultaneously launched on the same processor 191. Thus, each time a connection manager is launched, a flag indicating that a connection manager is active may be set in memory. In addition, the name of the currently launched connection manager may be stored in memory or a buffer. Each time the processor 191 receives a request to launch a connection manager, the processor 191 may first check the connection manager active flag to determine if it is set. If it is not set, then no connection manager is currently active. Therefore, the new connection manager may be launched without incident. However, if the connection manager active flag is set, the processor 191 may check to see which connection manager is currently active. If the currently active connection manager differs from the connection manager selected by the user for launch, then the processor 191 must deactivate the currently active connection manager prior to launching the selected connection manager. Such a connection manager tracker process may be used in embodiments where an independent connection manager exists for each service provider account or in embodiments where a common connection manager 60 allows a user to select a particular service provider account from a plurality of possible selections.

As previously discussed, at any time a processor 191 may receive a request from a user to launch a connection manager supporting a particular service provider account. For example, if the mobile device 10 is a cellular telephone, where communications are typically always active, the request to launch a connection manager would be in response to a user seeking to change the service provider account currently supporting communications. In other instances, such as when the mobile device 10 is a notebook computer with a wireless modem, communications capabilities are not always activated. Thus, the launching of a connection manager may indicate that the user wishes to enable wireless communications capability of the notebook computer. To prevent conflicting instructions to the software defined radio based chipset module 20, a currently enabled connection manager should be deactivated before a new connection manager is activated. If two different connection managers are concurrently activated, the possible conflicting software builds (e.g., a GSM software build and a CDMA software build) may cause errors in the software defined radio based chipset module 20. Accordingly, a process to track and control which connection manager is currently activated may be desired.

Figure 15:
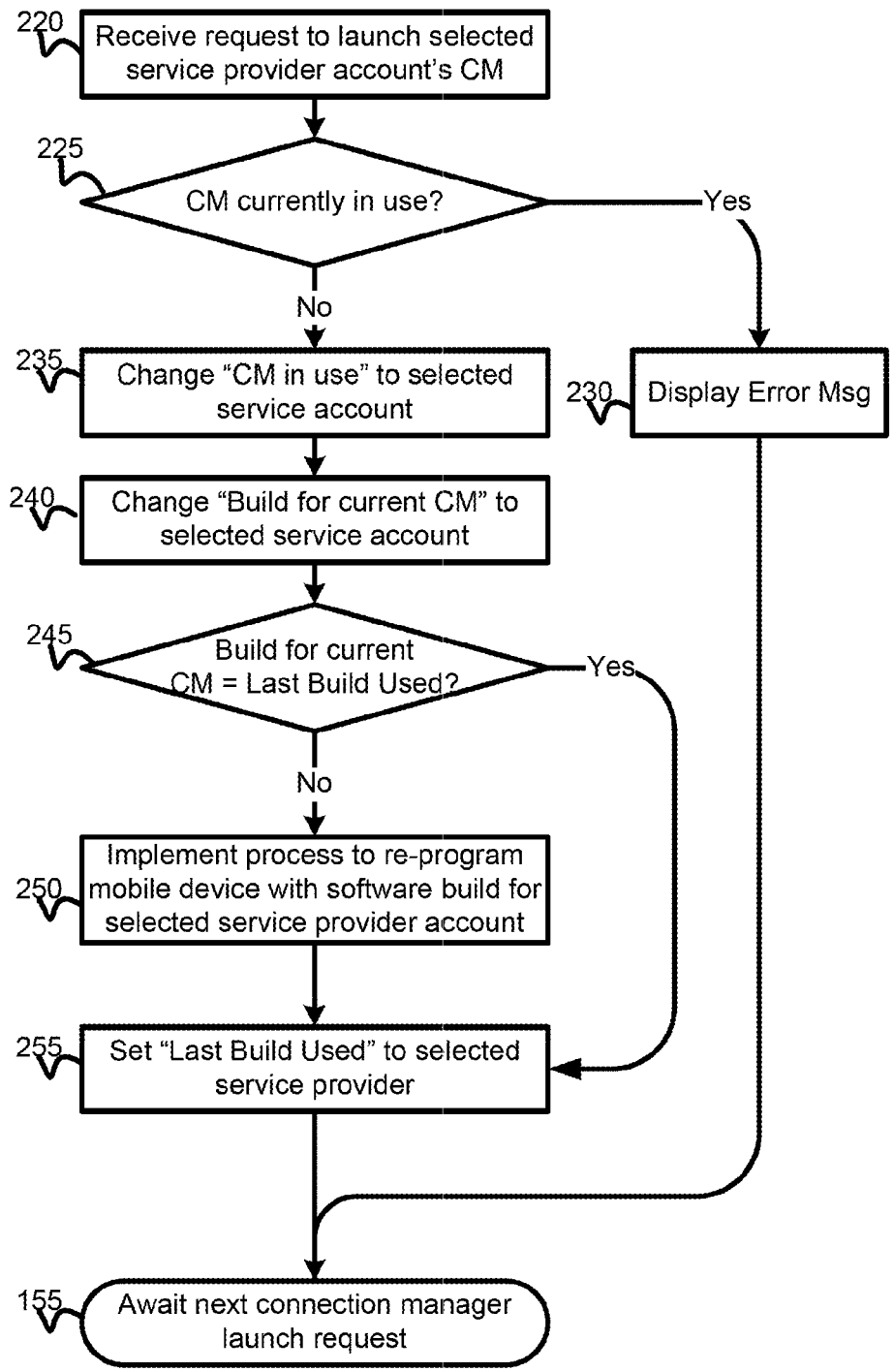
FIG. 15 is a process flow diagram illustrating a process that may be implemented by an exemplary connection manager tracker.

FIG. 15 is a process flow diagram illustrating example steps that may be implemented by an exemplary connection manager tracker. As part of a connection manager tracker process, a mobile device 10 may store a parameter table in memory or in a buffer which contains the values for a number of parameters related to the activity of various connection managers. These parameters may include a value for the current connection manager in use (CM in use), the last software build implemented on the mobile device (Last build used), and the software build implemented for the currently selected connection manager (Build for current CM). A mobile device 10 may be initialized by the OEM with certain values for each of these parameters. For example, the mobile device 10 may be initialized to set "CM in use," "Last build used," and "Build for current CM" parameters to "none." At any time a processor 191 may receive a request to launch a connection manager supporting a particular service provider account, step 220. Upon receipt of the request to launch a connection manager, the processor 191 may determine if a connection manager is currently running, decision 225. The processor 191 may make this determination by checking the value stored in the parameter table stored in memory for the "CM in use" value. If the "CM in use" value is anything other than "none", then the processor 191 will determine that a connection manager is currently in use (i.e., decision 225=Yes). If a connection manager is in use, then the processor 191 may display an error message to the user indicating that a connection manager is already running, step 230. The error message may optionally indicate that if the user desires to switch connection managers then the currently active connection manager should be closed before launching the currently selected connection manager. Once the error message is displayed to the user, the processor 191 may await the next connection manager launch request or selection of a different service provider, step 155.

If, however, the processor 191 determines that no connection manager is currently running, the processor 191 enters a value for the "CM in use" parameter as the name of the service provider of the selected connection manager request, step 235. The processor 191 also changes the value of the "Build for current CM" parameter in the parameter table to the name of the service provider of the selected connection manager request, step 240. The processor 191 may determine if the connection manager currently selected for launch is the same as or different from the last connection manager launched, decision 245. The processor 191 may compare the values of the parameters of the "Build for current CM" and "Last Build Used" stored in the parameter table. In instances where the mobile device 10 is being used for the first time to enable communication capabilities, the value of the parameter "Last Build Used" will be the initialized value of "none." As a result, the comparison of the "Build for current CM" parameter value will not match the value of the "Last Build Used" parameter (i.e., decision 245=No). In addition, if the user has selected to launch a connection manager different from the connection manager launched immediately prior to the instant connection manager, the comparison of the "Build for Current CM" and "Last Build Used" parameter will not result in a match (i.e., decision 245=No). If the comparison of the "Build for Current CM" and "Last Build Used" parameters does not result in a match (i.e., decision 245=No), the processor may implement the process flow to re-program the mobile device 10 described above with reference to FIG. 6, step 250. Once the mobile device 10 has been reprogrammed with the software build for the selected service provider account, the processor 191 may set the value of the "Last Build Used" parameter to indicate that the last build used is the software build of the currently selected service provider, step, 255. Once the new value of the "Last Build Used" parameter is stored in memory, the processor 191 may await the next connection manager launch request or selection of a different service provider, step 155.

If the comparison of the "Build for Current CM" and "Last Build Used" parameters results in a match (i.e., decision 245=Yes), then the processor 191 does not have to re-program the mobile device 10 with a new software build and the previously loaded software build may continue to support communications. Consequently, the processor 191 may set the value of the "Last Build Used" parameter to indicate that the last build used is the software build of the currently selected service provider, step, 255. Once the new value of the "Last Build Used" parameter is stored in memory, the processor 191 may await the next connection manager launch request or selection of a different service provider, step 155. In an optional embodiment, the processor 191 may simply skip step 255 and await the next connection manager launch request, step or selection of a different service provider.

When a user elects to disable the communication capabilities of the mobile device 10, the user may close any currently running connection manager. In such instances, the processor 191 will close the currently running connection manager and set the value of "CM in Use" parameter to "none."

Figure 16:
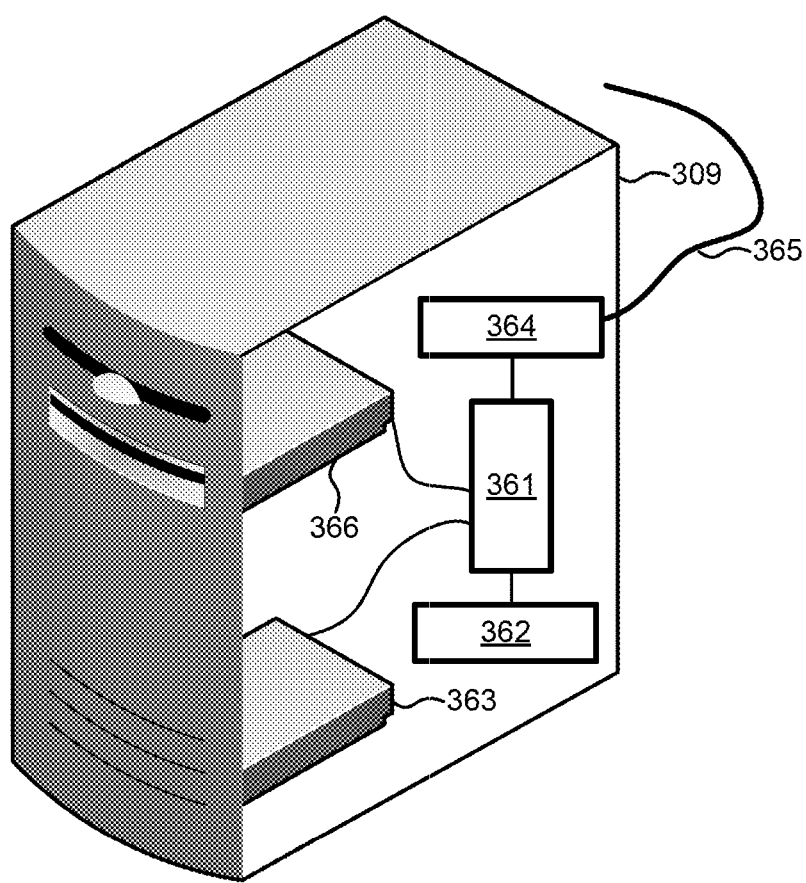
FIG. 16 is a component block diagram of an example server suitable for use with the various embodiments.

The embodiments described above may also be implemented on any of a variety of server systems such as illustrated in FIG. 16. Such a server 309 typically includes a processor 361 coupled to volatile memory 362 and a large capacity nonvolatile memory, such as a disk drive 363. The processor 361 is coupled to one or more network interface circuits, such as high speed modems 364 coupled to a network 365 such as the Internet. The computer 360 may also include a portable media reader, such as a compact disc (CD) drive 366 coupled to the processor 361.

Those of skill in the art would appreciate that the various illustrative logical blocks, modules, circuits, and algorithm steps described in connection with the embodiments disclosed herein may be implemented as electronic hardware or a combinations of software and hardware. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A method for programming a mobile device with a software build supporting a selected service provider account, comprising:
   receiving a service provider account selection;
   determining whether an account with the selected service provider is activated;
   retrieving software build parameters and settings from a non-volatile memory corresponding to the selected service provider account;
   implementing the software build supporting the selected service provider account using the retrieved software build parameters and settings, wherein implementing the software build supporting the selected service provider account comprises:
      retrieving an application programming interface and a dynamically linked library corresponding to the selected service provider account from memory;
      implementing the application programming interface and dynamically linked library;
      resetting a download service;
      deleting all previous parameters, settings, files and provisioning data from an extended file service;
      writing the retrieved software build parameters, provisioning data, files and settings into the extended files service;
      storing the retrieved software build parameters, files, provisioning data, and settings into the non-volatile memory; and
      resetting the mobile device;
   confirming prior activation of the selected service provider account, wherein confirming prior activation of the selected service provider account comprises:
      attempting to conduct a data call;
      determining whether the data call attempt was successful;
      determining whether the mobile device is located within the home network for the selected service provider account when the data call is unsuccessful;
      indicating a roaming condition when the mobile device is determined to be located outside the home network for the selected service provider account; and
      resetting factory default parameters and an indicator of account activation for the selected service provider when the mobile device is determined not to be located outside the home network for the selected service provider account;
   resetting a fail to connect counter to zero;
   incrementing the fail to connect counter when the data call is unsuccessful and the mobile device is determined to be within the home network for the selected service provider account;
   determining whether the fail to connect counter equals a predetermined number; and
   repeating attempts to conduct a data call when the number of connection attempts does not equal the predetermined number,
   wherein resetting factory default parameters and the indicator of account activation for the selected service provider is performed only when the fail to connect counter equals the predetermined number of connection attempts.

2. The method of claim 1, wherein implementing the software build supporting the selected service provider account further comprises:
   initiating an activation procedure for the selected service provider.

3. The method of claim 2, further comprising:
   determining whether the software build supporting the selected service provider account was successfully implemented;
   repeating the steps to implement the software build when the software build was not successfully implemented; and
   setting an indicator of account activation for the selected service provider.

4. A method for programming a mobile device with a software build supporting a selected service provider account, comprising:
   receiving a service provider account selection;
   determining whether an account with the selected service provider is activated;
   retrieving software build parameters and settings from a non-volatile memory corresponding to the selected service provider account;
   implementing the software build supporting the selected service provider account using the retrieved software build parameters and settings, wherein implementing the software build supporting the selected service provider account comprises:
      retrieving an application programming interface and a dynamically linked library corresponding to the selected service provider account from memory;
      implementing the application programming interface and dynamically linked library;
      resetting a download service;
      deleting all previous parameters, settings, files and provisioning data from an extended file service;
      writing the retrieved software build parameters, provisioning data, files and settings into the extended files service;
      storing the retrieved software build parameters, files, provisioning data, and settings into the non-volatile memory; and
      resetting the mobile device; and
   confirming prior activation of the selected service provider account, wherein confirming prior activation of the selected service provider account comprises:
      attempting to conduct a data call;
      determining whether the data call attempt was successful;
      determining whether the mobile device is located within the home network for the selected service provider account when the data call is unsuccessful;

indicating a roaming condition when the mobile device is determined to be located outside the home network for the selected service provider account;
storing existing mobile device credential values to a temporary file in memory;
changing the existing mobile device credential values to known working credential values for the selected service provider when the data call attempt is unsuccessful and the mobile device is not located outside the home network for the selected service provider;
contacting an accounts server to determine whether the selected service provider account is active;
performing a repair routine when the selected service provider account is determined to be active; and
resetting factory default parameters and an indicator of account activation for the selected service provider account when the selected service provider account is determined by the accounts server to be not active.

5. The method of claim 4, further comprising:
resetting a fail to connect counter to zero;
incrementing the fail to connect counter when the data call is unsuccessful and the mobile device is determined to be within the home network for the selected service provider account;
determining whether the fail to connect counter equals a predetermined number; and
repeating attempts to conduct a data call when the number of connection attempts does not equal the predetermined number, wherein the step of changing the existing mobile device credential values to known working credential values for the selected service provider is performed only when the fail to connect counter equals the predetermined number of connection attempts.

6. The method of claim 4, wherein said repair routine further comprises:
comparing the existing mobile device credential values to selected service provider account credential values stored in the selected service provider's HLR/AAA server to determine whether there is a discrepancy between the values when it is determined that the account with the selected service provider is active; and
changing the known working credential values to the credential values stored in the selected service provider's HLR/AAA server when a discrepancy exists.

7. A mobile device comprising:
means for receiving a service provider account selection;
means for determining whether an account with the selected service provider is activated;
means for retrieving software build parameters and settings from a non-volatile memory corresponding to the selected service provider account;
means for implementing the software build supporting the selected service provider account using the retrieved software build parameters and settings, wherein means for implementing the software build supporting the selected service provider account comprises:
means for retrieving an application programming interface and a dynamically linked library corresponding to the selected service provider account from memory;
means for implementing the application programming interface and dynamically linked library;
means for resetting a download service;
means for deleting all previous parameters, settings, files and provisioning data from an extended file service;
means for writing the retrieved software build parameters, provisioning data, files and settings into the extended files service;
means for storing the retrieved software build parameters, files, provisioning data, and settings into non-volatile memory; and
means for resetting the mobile device;
means for confirming prior activation of the selected service provider account comprising:
means for attempting to conduct a data call;
means for determining whether the data call attempt was successful;
means for determining whether the mobile device is located within the home network for the selected service provider account when the data call is unsuccessful;
means for indicating a roaming condition when the mobile device is determined to be located outside the home network for the selected service provider account;
means for resetting factory default parameters; and
means for resetting factory default parameters and an indicator of account activation for the selected service provider when the mobile device is determined to be not located outside the home network for the selected service provider account;
means for resetting a fail to connect counter to zero;
means for incrementing the fail to connect counter when the data call is unsuccessful and the mobile device is determined to be within the home network for the selected service provider account;
means for determining whether the fail to connect counter equals a predetermined number; and
means for repeating attempts to conduct a data call when the fail to connect counter does not equal the predetermined number,
wherein means for resetting factory default parameters and means for resetting the indicator of account activation for the selected service provider do so only when the fail to connect counter equals the predetermined number of connection attempts.

8. The mobile device of claim 7, wherein said means for implementing the software build supporting the selected service provider account further comprises:
means for initiating an activation procedure for the selected service provider.

9. The mobile device of claim 8 further comprising:
means for determining whether the software build supporting the selected service provider account was successfully implemented;
means for repeating the steps to implement the software build when the software build was not successfully implemented; and
means for setting an indicator of account activation for the selected service provider.

10. A mobile device comprising:
means for receiving a service provider account selection;
means for determining whether an account with the selected service provider is activated;
means for retrieving software build parameters and settings from a non-volatile memory corresponding to the selected service provider account;
means for implementing the software build supporting the selected service provider account using the retrieved software build parameters and settings, wherein means for implementing the software build supporting the selected service provider account comprises:

means for retrieving an application programming interface and a dynamically linked library corresponding to the selected service provider account from memory;
means for implementing the application programming interface and dynamically linked library;
means for resetting a download service;
means for deleting all previous parameters, settings, files and provisioning data from an extended file service;
means for writing the retrieved software build parameters, provisioning data, files and settings into the extended files service;
means for storing the retrieved software build parameters, files, provisioning data, and settings into the non-volatile memory; and
means for resetting the mobile device; and
means for confirming prior activation of the selected service provider account comprising:
means for attempting to conduct a data call;
means for determining whether the data call attempt was successful;
means for determining whether the mobile device is located within the home network for the selected service provider account when the data call is unsuccessful;
means for indicating a roaming condition when the mobile device is determined to be located outside the home network for the selected service provider account;
means for storing existing mobile device credential values to a temporary file in memory;
means for changing the existing mobile device credential values to known working credential values for the selected service provider when the data call attempt is unsuccessful and the mobile device is not located outside the home network for the selected service provider;
means for contacting an accounts server to determine whether the selected service provider account is active;
means for performing a repair routine when the selected service provider account is determined to be active;
means for resetting factory default parameters; and
means for resetting an indicator of account activation for the selected service provider account when the selected service provider account is determined by the accounts server to be not active.

11. The mobile device of claim 10, further comprising:
means for resetting a fail to connect counter to zero;
means for incrementing the fail to connect counter when the date call is unsuccessful and the mobile device is determined to be within the home network for the selected service provider account;
means for determining whether the fail to connect counter equals a predetermined number; and
means for repeating attempts to conduct a data call when the number of connection attempts does not equal the predetermined number, wherein said means for changing the existing mobile device credential values to known working credential values for the selected service provider does so only when the fail to connect counter equals the predetermined number of connection attempts.

12. The mobile device of claim 10, wherein said means for performing the repair routine further comprises:

means for comparing the existing mobile device credential values to selected service provider account credential values stored in the selected service provider's HLR/AAA server to determine whether there is a discrepancy between the values when it is determined that the account with the selected service provider is active; and
means for changing the known working credential values to the credential values stored in the selected service provider's HLR/AAA server when a discrepancy exists.

13. A mobile device, comprising:
an internal memory unit, the internal memory unit including a provisioning data buffer; and
a processor coupled to the internal memory unit, wherein the processor is configured with software instructions to perform steps comprising:
receiving a service provider account selection;
determining whether an account with the selected service provider is activated;
retrieving software build parameters and settings from a non-volatile memory corresponding to the selected service provider account;
implementing the software build supporting the selected service provider account using the retrieved software build parameters and settings, wherein implementing the software build supporting the selected service provider account comprises:
retrieving an application programming interface and a dynamically linked library corresponding to the selected service provider account from memory;
implementing the application programming interface and dynamically linked library;
resetting a download service;
deleting all previous parameters, settings, files and provisioning data from an extended file service;
writing the retrieved software build parameters, provisioning data, files and settings into the extended files service;
storing the retrieved software build parameters, files, provisioning data, and settings into the non-volatile memory; and
resetting the mobile device;
confirming prior activation of the selected service provider account, wherein confirming prior activation of the selected service provider account comprises:
attempting to conduct a data call;
determining whether the data call attempt was successful;
determining whether the mobile device is located within the home network for the selected service provider account when the data call is unsuccessful;
indicating a roaming condition when the mobile device is determined to be located outside the home network for the selected service provider account; and
resetting factory default parameters and an indicator of account activation for the selected service provider when the mobile device is determined to be not located outside the home network for the selected service provider account;
resetting a fail to connect counter to zero;
incrementing the fail to connect counter when the data call is unsuccessful and the mobile device is determined to be within the home network for the selected service provider account;
determining whether the fail to connect counter equals a predetermined number; and repeating attempts to conduct a data call when the number of connection attempts does not equal the predetermined number,
wherein resetting factory default parameters and the indicator of account activation for the selected service provider is performed only when the fail to connect counter equals the predetermined number of connection attempts.

14. The mobile device of claim 13, wherein the processor is configured with software instructions to perform further steps for implementing the software build supporting the selected service provider account comprising:
   initiating an activation procedure for the selected service provider.

15. The mobile device of claim 14, wherein the processor is configured with software instructions to perform further steps comprising:
   determining whether the software build supporting the selected service provider account was successfully implemented;
   repeating the steps to implement the software build when the software build was not successfully implemented; and
   setting an indicator of account activation for the selected service provider.

16. A mobile device, comprising:
   an internal memory unit, the internal memory unit including a provisioning data buffer; and
   a processor coupled to the internal memory unit, wherein the processor is configured with software instructions to perform steps comprising:
      receiving a service provider account selection;
      determining whether an account with the selected service provider is activated;
      retrieving software build parameters and settings from a non-volatile memory corresponding to the selected service provider account;
      implementing the software build supporting the selected service provider account using the retrieved software build parameters and settings, wherein implementing the software build supporting the selected service provider account comprises:
         retrieving an application programming interface and a dynamically linked library corresponding to the selected service provider account from memory;
         implementing the application programming interface and dynamically linked library;
         resetting a download service;
         deleting all previous parameters, settings, files and provisioning data from an extended file service;
         writing the retrieved software build parameters, provisioning data, files and settings into the extended files service;
         storing the retrieved software build parameters, files, provisioning data, and settings into the non-volatile memory; and
         resetting the mobile device; and
      confirming prior activation of the selected service provider account, wherein confirming prior activation of the selected service provider account comprises:
         attempting to conduct a data call;
         determining whether the data call attempt was successful;
         determining whether the mobile device is located within the home network for the selected service provider account when the data call is unsuccessful;
         indicating a roaming condition when the mobile device is determined to be located outside the home network for the selected service provider account;
         storing existing mobile device credential values to a temporary file in memory;
         changing the existing mobile device credential values to known working credential values for the selected service provider when the data call attempt is unsuccessful and the mobile device is not located outside the home network for the selected service provider;
         contacting an accounts server to determine whether the selected service provider account is active;
         performing a repair routine when the selected service provider account is determined to be active; and
         resetting factory default parameters and an indicator of account activation for the selected service provider account when the selected service provider account is determined by the accounts server to be not active.

17. The mobile device of claim 16, wherein the processor is configured with software instructions to perform further steps comprising:
   resetting a fail to connect counter to zero;
   incrementing the fail to connect counter when the data call is unsuccessful and the mobile device is determined to be within the home network for the selected service provider account;
   determining whether the fail to connect counter equals a predetermined number; and
   repeating attempts to conduct a data call when the number of connection attempts does not equal the predetermined number, wherein the step of changing the existing mobile device credential values to known working credential values for the selected service provider is performed only when the fail to connect counter equals the predetermined number of connection attempts.

18. The mobile device of claim 16, wherein the processor is configured with software instructions to perform further steps comprising:
   comparing the existing mobile device credential values to selected service provider account credential values stored in the selected service provider's HLR/AAA server to determine whether there is a discrepancy between the values when it is determined that the account with the selected service provider is active; and
   changing the known working credential values to the credential values stored in the selected service provider's HLR/AAA server when a discrepancy exists.

19. A non-transitory storage medium having stored thereon processor-executable software instructions configured to cause a processor to perform steps comprising:
   receiving a service provider account selection;
   determining whether an account with the selected service provider is activated;
   retrieving software build parameters and settings from a non-volatile memory corresponding to the selected service provider account;
   implementing the software build supporting the selected service provider account using the retrieved software build parameters and settings, wherein implementing the software build supporting the selected service provider account comprises:
      retrieving an application programming interface and a dynamically linked library corresponding to the selected service provider account from memory;

implementing the application programming interface and dynamically linked library;

resetting a download service;

deleting all previous parameters, settings, files and provisioning data from an extended file service;

writing the retrieved software build parameters, provisioning data, files and settings into the extended files service;

storing the retrieved software build parameters, files, provisioning data, and settings into the non-volatile memory; and resetting the mobile device;

confirming prior activation of the selected service provider account, wherein confirming prior activation of the selected service provider account comprises:

attempting to conduct a data call;

determining whether the data call attempt was successful;

determining whether the mobile device is located within the home network for the selected service provider account when the data call is unsuccessful;

indicating a roaming condition when the mobile device is determined to be located outside the home network for the selected service provider account; and resetting factory default parameters and an indicator of account activation for the selected service provider when the mobile device is determined not to be located outside the home network for the selected service provider account;

resetting a fail to connect counter to zero;

incrementing the fail to connect counter when the data call is unsuccessful and the mobile device is determined to be within the home network for the selected service provider account;

determining whether the fail to connect counter equals a predetermined number; and repeating attempts to conduct a data call when the number of connection attempts does not equal the predetermined number, wherein resetting factory default parameters and the indicator of account activation for the selected service provider is performed only when the fail to connect counter equals the predetermined number of connection attempts.

20. The non-transitory storage medium of claim 19, wherein the stored processor-executable software instructions are configured to cause a processor to perform operations such that implementing the software build supporting the selected service provider account further comprises:

initiating an activation procedure for the selected service provider.

21. The non-transitory storage medium of claim 20, wherein the stored processor-executable software instructions are configured to cause a processor to perform further steps comprising:

determining whether the software build supporting the selected service provider account was successfully implemented;

repeating the steps to implement the software build when the software build was not successfully implemented; and setting an indicator of account activation for the selected service provider.

22. A non-transitory storage medium having stored thereon processor-executable software instructions configured to cause a processor to perform steps comprising:

receiving a service provider account selection;

determining whether an account with the selected service provider is activated;

retrieving software build parameters and settings from a non-volatile memory corresponding to the selected service provider account;

implementing the software build supporting the selected service provider account using the retrieved software build parameters and settings, wherein implementing the software build supporting the selected service provider account comprises:

retrieving an application programming interface and a dynamically linked library corresponding to the selected service provider account from memory;

implementing the application programming interface and dynamically linked library;

resetting a download service;

deleting all previous parameters, settings, files and provisioning data from an extended file service;

writing the retrieved software build parameters, provisioning data, files and settings into the extended files service;

storing the retrieved software build parameters, files, provisioning data, and settings into the non-volatile memory; and resetting the mobile device; and confirming prior activation of the selected service provider account, wherein confirming prior activation of the selected service provider account comprises:

attempting to conduct a data call;

determining whether the data call attempt was successful;

determining whether the mobile device is located within the home network for the selected service provider account when the data call is unsuccessful;

indicating a roaming condition when the mobile device is determined to be located outside the home network for the selected service provider account;

storing existing mobile device credential values to a temporary file in memory;

changing the existing mobile device credential values to known working credential values for the selected service provider when the data call attempt is unsuccessful and the mobile device is not located outside the home network for the selected service provider;

contacting an accounts server to determine when the selected service provider account is active;

performing a repair routine when the selected service provider account is determined to be active; and resetting factory default parameters and an indicator of account activation for the selected service provider account when the selected service provider account is determined by the accounts server to be not active.

23. The non-transitory storage medium of claim 22, wherein the stored processor-executable software instructions are configured to cause a processor to perform further steps comprising:

resetting a fail to connect counter to zero;

incrementing the fail to connect counter when the data call is unsuccessful and the mobile device is determined to be within the home network for the selected service provider account;

determining whether the fail to connect counter equals a predetermined number; and repeating attempts to conduct a data call when the number of connection attempts does not equal the predetermined number, wherein the step of changing the existing mobile device credential values to known working credential values for the selected service provider is performed only when the fail to connect counter equals the predetermined number of connection attempts.

24. The non-transitory storage medium of claim 22, wherein the stored processor-executable software instructions are configured to cause a processor to perform further steps comprising:
  comparing the existing mobile device credential values to selected service provider account credential values stored in the selected service provider's HLR/AAA server to determine whether there is a discrepancy between the values when it is determined that the account with the selected service provider is active; and
  changing the known working credential values to the credential values stored in the selected service provider's HLR/AAA server when a discrepancy exists.

* * * * *